United States Patent
Cai

(10) Patent No.: US 12,188,787 B2
(45) Date of Patent: Jan. 7, 2025

(54) POSITION DETECTION UNIT, LENS MODULE, AND IMAGING APPARATUS

(71) Applicant: TDK CORPORATION, Tokyo (JP)

(72) Inventor: Yongfu Cai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 873 days.

(21) Appl. No.: 17/243,242

(22) Filed: Apr. 28, 2021

(65) Prior Publication Data

US 2021/0372819 A1 Dec. 2, 2021

(30) Foreign Application Priority Data

May 28, 2020 (JP) .................................. 2020-093498
Apr. 7, 2021 (JP) .................................. 2021-065177

(51) Int. Cl.
G01D 5/14 (2006.01)
G02B 7/02 (2021.01)
G02B 7/08 (2021.01)

(52) U.S. Cl.
CPC ............... G01D 5/145 (2013.01); G02B 7/08 (2013.01)

(58) Field of Classification Search
CPC .......... G01D 5/145; G01D 5/14; G01D 5/142; G02B 7/08; G02B 7/28; G02B 27/646; G03B 5/00; G03B 13/18

See application file for complete search history.

(56) References Cited

U.S. PATENT DOCUMENTS

| 10,295,781 B2 | 5/2019 | Park et al. |
| 10,712,178 B2 | 7/2020 | Uchida et al. |
| 2017/0108355 A1* | 4/2017 | Shimauchi ......... G01D 5/24438 |
| 2019/0041661 A1 | 2/2019 | Murakami |
| 2019/0128699 A1* | 5/2019 | Uchida .................. G01D 5/145 |
| 2020/0088507 A1* | 3/2020 | Cai .......................... G01B 7/30 |
| 2021/0063135 A1* | 3/2021 | Antoku .................... G01B 7/30 |
| 2021/0255000 A1* | 8/2021 | Cai ...................... G02B 27/646 |

FOREIGN PATENT DOCUMENTS

| JP | 2016-217932 A | 12/2016 |
| JP | 2017-510841 A | 4/2017 |
| JP | 2019-082445 A | 5/2019 |
| WO | 2017/138041 A1 | 8/2017 |
| WO | 2018/051729 A1 | 3/2018 |

* cited by examiner

*Primary Examiner* — Jermele M Hollington
*Assistant Examiner* — Zannatul Ferdous
(74) *Attorney, Agent, or Firm* — Oliff PLC

(57) ABSTRACT

A position detection unit includes a magnetic sensor, a first magnetic field generator, and a second magnetic field generator. The first magnetic field generator includes a first magnet and a second magnet spaced apart from each other in a first direction, and generates a first magnetic field. The second magnetic field generator generates a second magnetic field and is movable along a second direction orthogonal to the first direction with respect to the first magnetic field generator and the magnetic sensor. In the first direction, a center position of the magnetic sensor lies at a position in a region between the first magnet and the second magnet other than a midpoint position between the first magnet and the second magnet. The magnetic sensor generates a detection signal corresponding to a direction of a magnetic field to be detected, and detects a positional change of the second magnetic field generator.

16 Claims, 19 Drawing Sheets

POSITION DETECTION UNIT, LENS MODULE, AND IMAGING APPARATUS

CROSS REFERENCE TO RELATED APPLICATIONS

This application claims the benefit of Japanese Priority Patent Application Nos. 2020-093498 filed on May 28, 2020 and 2021-065177 filed on Apr. 7, 2021, the entire contents of each of which are incorporated herein by reference.

BACKGROUND

The technology relates to a position detection unit, a lens module, and an imaging apparatus that each include a magnetic sensor.

Position detection units using magnetic sensors have been proposed. The Applicant has proposed, for example, a camera module including a position detection unit. For example, reference is made to Japanese Unexamined Patent Application Publication No. 2019-082445. In the camera module, the position detection unit detects the position of a lens that moves in performing focusing. WO 2018/051729 A1 proposes a lens driving device including a position detecting magnet and a magnetism detection member. The position detecting magnet detects a movement position of a lens holding member.

SUMMARY

A position detection unit according to one embodiment of the technology includes a magnetic sensor, a first magnetic field generator, and a second magnetic field generator. The first magnetic field generator includes a first magnet and a second magnet, and generates a first magnetic field. The first magnet and the second magnet are spaced apart from each other in a first direction. The second magnetic field generator generates a second magnetic field, and is movable along a second direction orthogonal to the first direction with respect to the first magnetic field generator and the magnetic sensor. In the first direction, a center position of the magnetic sensor lies at a position in a region between the first magnet and the second magnet other than a midpoint position between the first magnet and the second magnet. The magnetic sensor is configured to generate a detection signal corresponding to a direction of a detection-target magnetic field, and configured to detect a positional change of the second magnetic field generator. The detection-target magnetic field is a magnetic field to be detected, and is a composite of the first magnetic field along a plane orthogonal to the second direction and the second magnetic field along the plane.

A lens module according to one embodiment of the technology includes a magnetic sensor, a first magnetic field generator, a second magnetic field generator, and a lens. The first magnetic field generator includes a first magnet and a second magnet, and generates a first magnetic field. The first magnet and the second magnet are spaced apart from each other in a first direction. The second magnetic field generator generates a second magnetic field, and is movable along a second direction orthogonal to the first direction with respect to the first magnetic field generator and the magnetic sensor. The lens is movable along the second direction in conjunction with the second magnetic field generator with respect to the first magnetic field generator and the magnetic sensor. In the first direction, a center position of the magnetic sensor lies at a position in a region between the first magnet and the second magnet other than a midpoint position between the first magnet and the second magnet. The magnetic sensor is configured to generate a detection signal corresponding to a direction of a detection-target magnetic field, and configured to detect a positional change of the second magnetic field generator. The detection-target magnetic field is a magnetic field to be detected, and is a composite of the first magnetic field along a plane orthogonal to the second direction and the second magnetic field along the plane.

An imaging apparatus according to one embodiment of the technology includes an imaging element and a lens module. The lens module includes a magnetic sensor, a first magnetic field generator, a second magnetic field generator, and a lens. The first magnetic field generator includes a first magnet and a second magnet, and generates a first magnetic field. The first magnet and the second magnet are spaced apart from each other in a first direction. The second magnetic field generator generates a second magnetic field, and is movable along a second direction orthogonal to the first direction with respect to the first magnetic field generator and the magnetic sensor. The lens is movable along the second direction in conjunction with the second magnetic field generator with respect to the first magnetic field generator and the magnetic sensor. In the first direction, a center position of the magnetic sensor lies at a position in a region between the first magnet and the second magnet other than a midpoint position between the first magnet and the second magnet. The magnetic sensor is configured to generate a detection signal corresponding to a direction of a detection-target magnetic field, and configured to detect a positional change of the second magnetic field generator. The detection-target magnetic field is a magnetic field to be detected, and is a composite of the first magnetic field along a plane orthogonal to the second direction and the second magnetic field along the plane.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
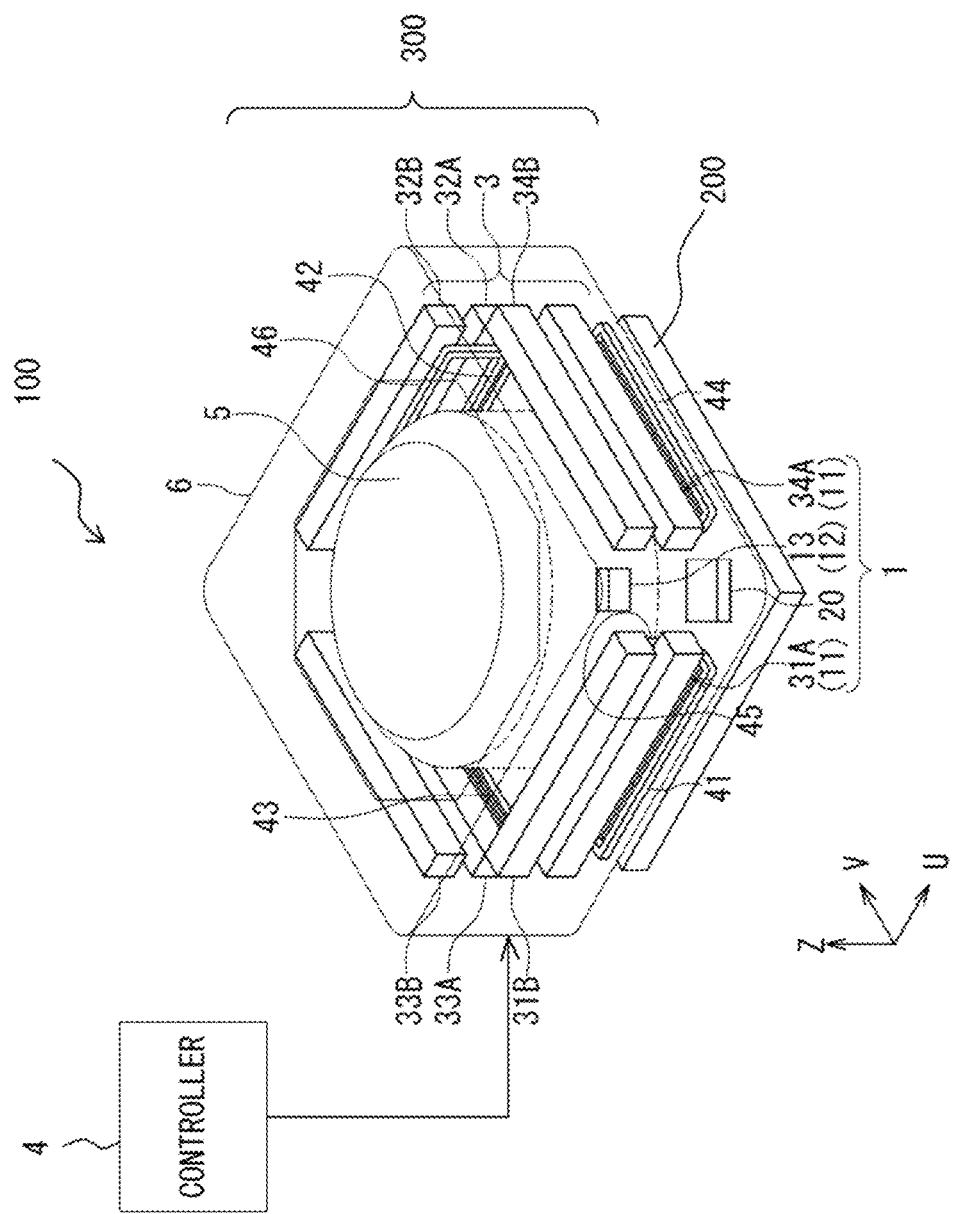
FIG. 1 is a schematic perspective diagram illustrating an overall configuration example of an imaging apparatus including a lens module that includes a position detection unit according to one example embodiment of the technology.

It is demanded that position detection units using magnetic sensors be improved in position detection accuracy.

It is desirable to provide a position detection unit, a lens module, and an imaging apparatus that achieve high detection accuracy.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

1. Example Embodiment

An example of an imaging apparatus including a lens module. The lens module includes a first magnetic field generator, a second magnetic field generator, and a magnetic sensor. The first magnetic field generator generates a first magnetic field for driving a lens. The second magnetic field generator generates a second magnetic field and moves along with the lens. The magnetic sensor detects the position of the lens.

2. Modification Examples

1. Example Embodiment

Configuration of Imaging Apparatus 100

First, a configuration of an imaging apparatus 100 according to an example embodiment of the technology will be described with reference to FIGS. 1 and 2.

FIG. 1 is a perspective diagram illustrating an overall configuration example of the imaging apparatus 100. FIG. 2 is an explanatory diagram schematically illustrating the inside of the imaging apparatus 100. It is to be noted that for ease of understanding, in FIG. 2 the components of the imaging apparatus 100 are drawn on a different scale and in a different layout than those of the corresponding components in FIG. 1.

The imaging apparatus 100 may constitute, for example, a portion of a camera for a smartphone having an optical image stabilization mechanism and an autofocus mechanism. The imaging apparatus 100 includes an image sensor 200 as an imaging element, and a lens module 300, for example. The image sensor 200 may acquire an image by using a complementary metal-oxide semiconductor (CMOS) or the like. The lens module 300 may guide light from a subject to the image sensor 200.

Configuration of Lens Module 300

The lens module 300 may include a position detection unit 1 according to an example embodiment of the technology, and a drive unit 3, a lens 5, a housing 6, and a substrate 7. The position detection unit 1 may be a magnetic position detection unit and may detect the position of the lens 5 in performing automatic focusing on light entering from the subject (hereinafter, simply "entering light") to allow the entering light to form an image on an imaging plane of the image sensor 200. The drive unit 3 may move the lens 5 to perform the focusing on the entering light. The housing 6 may accommodate and protect the components including the position detection unit 1 and the drive unit 3. The substrate 7 may have a top surface 7a. The top surface 7a may correspond to a specific but non-limiting example of a "plane" according to one embodiment of the technology. Note that FIG. 1 omits the illustration of the substrate 7 and FIG. 2 omits the illustration of the housing 6.

Figure 2:
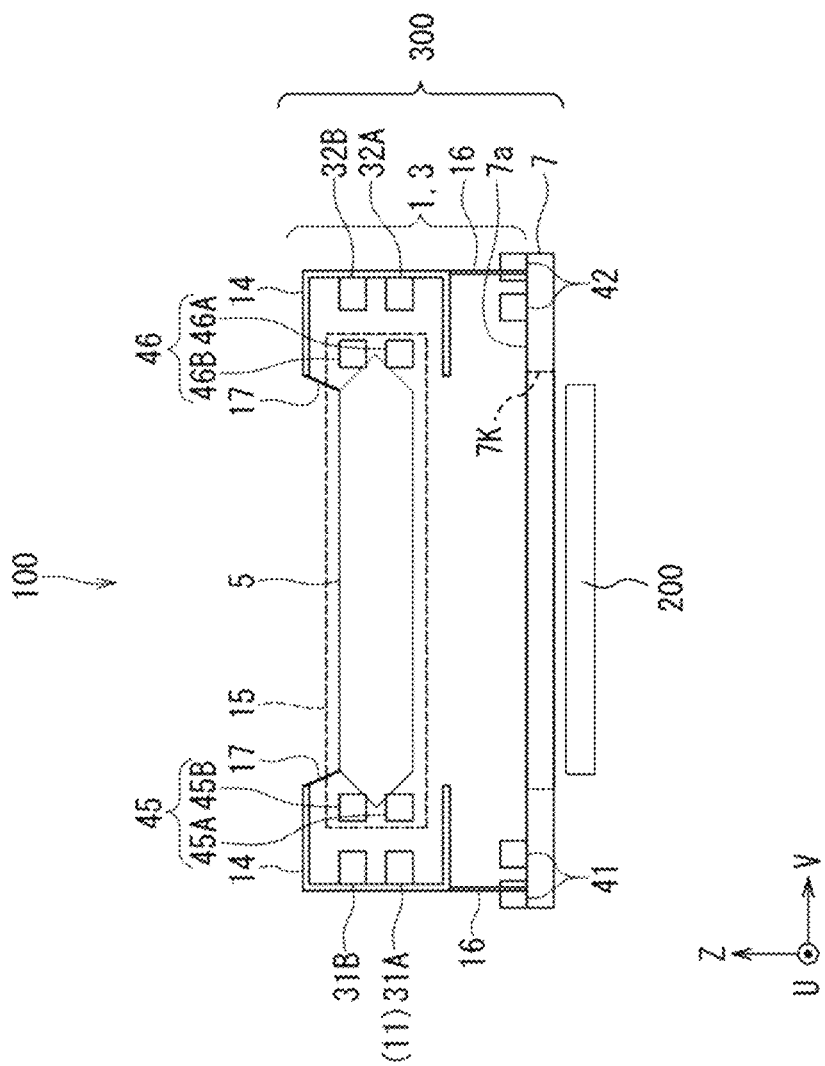
FIG. 2 is an explanatory diagram schematically illustrating the inside of the imaging apparatus illustrated in FIG. 1.

Here, a U-axis, a V-axis, and a Z-axis are defined as illustrated in FIGS. 1 and 2. The U-axis, the V-axis, and the Z-axis are orthogonal to each other. In the present example embodiment, the Z-axis is perpendicular to the top surface 7a of the substrate 7, and both the U-axis and the V-axis are parallel to the top surface 7a of the substrate 7. Further, in the present example embodiment, a +Z direction is upward, and a −Z direction is downward.

Each of the +Z direction and the −Z direction, that is, a direction parallel to the Z-axis, may correspond to a specific but non-limiting example of a "second direction" according to one embodiment of the technology.

Lens 5

The lens 5 may be disposed above the top surface 7a of the substrate 7, with its optical axis coinciding with the Z-axis. The substrate 7 may have an opening 7K that allows light having passed through the lens 5 to pass therethrough. As illustrated in FIG. 2, the lens module 300 may be in alignment with the image sensor 200 to allow the light from the subject to enter the image sensor 200 after passing through the lens 5 and the opening 7K of the substrate 7 in this order.

Position Detection Unit 1 and Drive Unit 3

Figure 3:
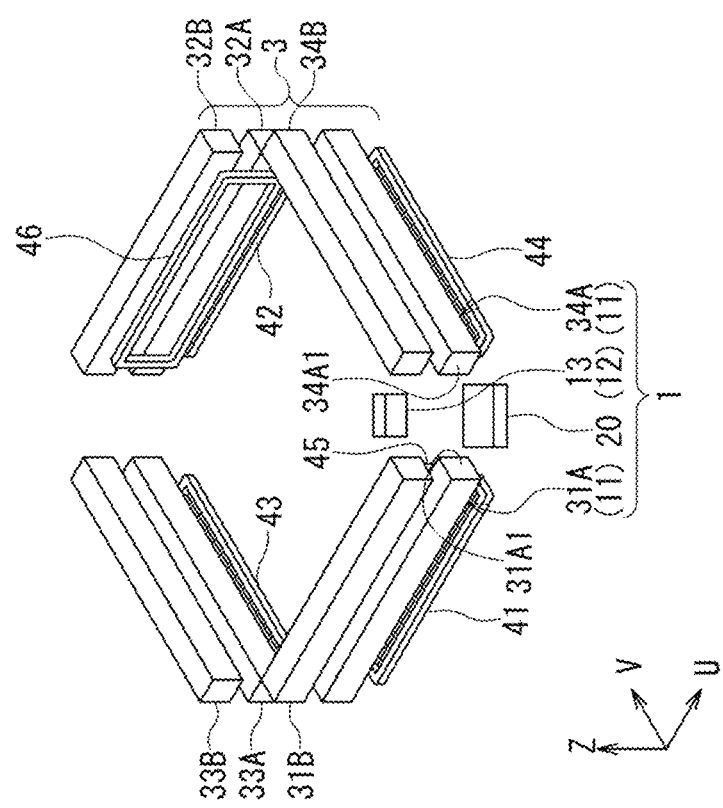
FIG. 3 is an explanatory diagram schematically illustrating a portion of the position detection unit illustrated in FIG. 1.
Figure 4:
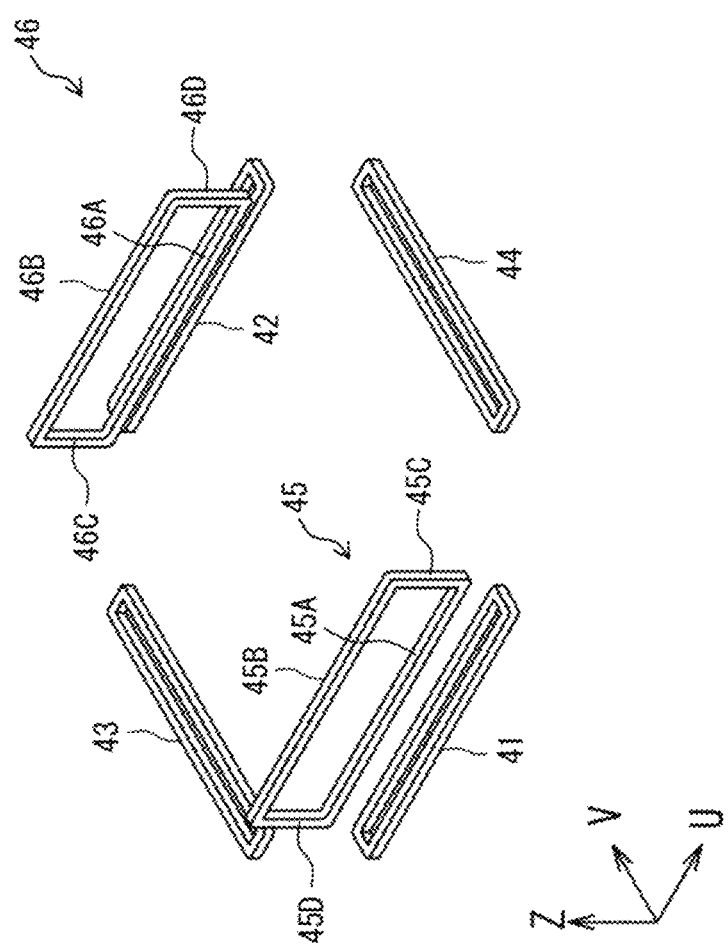
FIG. 4 is an explanatory diagram schematically illustrating a portion of a drive unit illustrated in FIG. 1.
Figure 5:
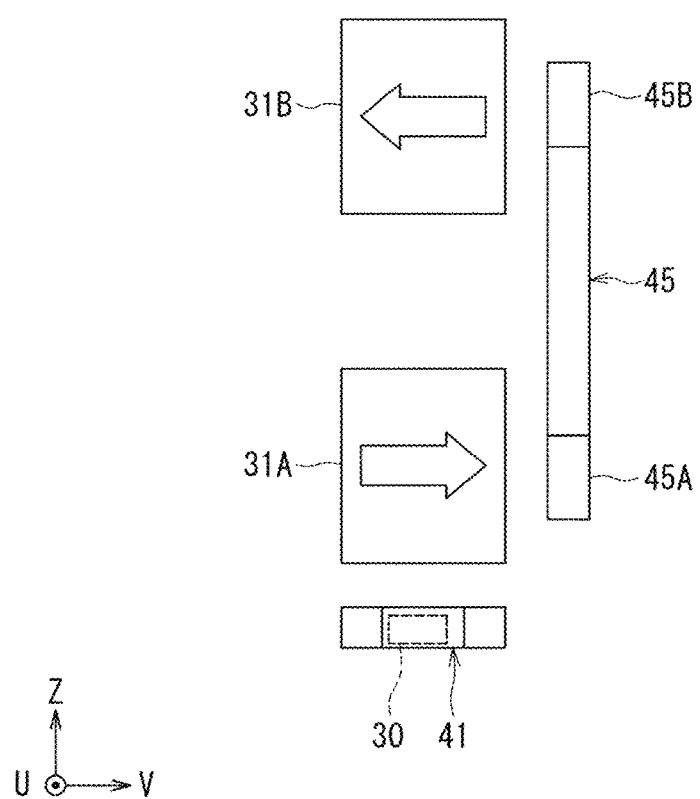
FIG. 5 is a side view of a portion of the drive unit illustrated in FIG. 1.

Next, the position detection unit 1 according to the present example embodiment and the drive unit 3 will be described in detail with reference to FIGS. 2 to 5. FIG. 3 is a perspective view of the position detection unit 1 and the drive unit 3 of the lens module 300. FIG. 4 is a perspective view of coils 41 to 46 of the drive unit 3. FIG. 5 is a side view of a portion of the drive unit 3.

The position detection unit 1 may include a first holding member 14, a second holding member 15, two or more first wires 16, and two or more second wires 17. The second holding member 15 may hold the lens 5. The second holding member 15 may have, for example, a hollow cylinder shape to allow the lens 5 to be installed therein. Note that the first wires 16 and the second wires 17 may be omitted from the position detection unit 1.

The second holding member 15 may be movable along a direction of the optical axis of the lens 5, that is, along a Z-axis direction with respect to the first holding member 14. In the present example embodiment, the first holding member 14 may have a box shape allowing the lens 5 and the second holding member 15 to be placed therein. The two or more second wires 17 may couple the first holding member 14 and the second holding member 15 to each other, and may support the second holding member 15 to allow the second holding member 15 to be movable along the Z-axis direction with respect to the first holding member 14.

The first holding member 14 may be provided above the top surface 7a of the substrate 7 and movable in both of a U-axis direction and a V-axis direction with respect to the substrate 7. The two or more first wires 16 may, while coupling the substrate 7 and the first holding member 14 to each other, support the first holding member 14 to allow the first holding member 14 to be movable in both of the U-axis direction and the V-axis direction with respect to the substrate 7. Upon a change in a relative position of the first holding member 14 with respect to the substrate 7, a relative position of the second holding member 15 with respect to the substrate 7 may also change.

The position detection unit 1 further includes a first magnetic field generator 11 generating a first magnetic field MF1, a second magnetic field generator 12 generating a second magnetic field MF2, and a magnetic sensor 20. The first magnetic field generator 11 includes a first magnet and a second magnet that are spaced apart from each other at different positions. In a specific but non-limiting example, the first magnetic field generator 11 may include, as the first magnet and the second magnet, a magnet 31A and a magnet 34A that are disposed along the top surface 7a of the substrate 7 with the magnetic sensor 20 interposed therebetween. Note that the magnet 31A and the magnet 34A may also be components of the drive unit 3. The first magnetic field MF1 may be a composite magnetic field of a magnetic field generated by the magnet 31A and a magnetic field generated by the magnet 34A. The magnets 31A and 34A may each include a first magnetic material, and may each have a rectangular parallelepiped shape, for example. Examples of the first magnetic material include a neodymium-based magnet material such as NdFeB. The magnets 31A and 34A may each have a first temperature coefficient of residual magnetic flux density. The magnets 31A and 34A may be fixed to the first holding member 14. In other words, the first magnetic field generator 11 may be held by the first holding member 14. The magnets 31A and 34A may each serve as a drive magnet that generates a drive force to cause the second holding member 15 holding the lens 5 to move along the Z-axis. In addition, the magnets 31A and 34A may also serve as bias magnets to apply a bias to the magnetic sensor 20.

As illustrated in FIG. 3, the magnet 31A may have an end face 31A1 located at an end of the magnet 31A in a +U direction. The magnet 34A may have an end face 34A1 located at an end of the magnet 34A in a −V direction.

The second magnetic field generator 12 may be provided with its relative position with respect to the first magnetic field generator 11 being changeable. The second magnetic field generator 12 may include a magnet 13, for example. The second magnetic field MF2 may thus be a magnetic field generated by the magnet 13. The magnet 13 may include a second magnetic material different from the first magnetic material. The magnet 13 may have a rectangular parallelepiped shape, for example, as with the magnets 31A and 34A. However, the shape of the magnet 13 may be different from the shape of the magnets 31A and 34A. Examples of the second magnetic material include a neodymium-based magnet material such as NdFeB. Optionally, SmCo may be used as the second magnetic material. The magnet 13 may have a second temperature coefficient of residual magnetic flux density. In some embodiments, the second temperature coefficient of residual magnetic flux density that the magnet 13 has may be smaller in absolute value than the first temperature coefficient of residual magnetic flux density that the magnets 31A and 34A have. The magnet 13 may serve as a magnet for position detection that generates the second magnetic field MF2 for use to detect the position of the second holding member 15 holding the lens 5.

The magnet 13 may be fixed to the second holding member 15 and located in a space near the end face 31A1 (FIG. 3) of the magnet 31A and the end face 34A1 (FIG. 3) of the magnet 34A. In other words, the second magnetic field generator 12 may be held by the second holding member 15. Upon a change in a relative position of the second holding member 15 with respect to the first holding member 14 along the Z-axis direction, the relative position of the second magnetic field generator 12 with respect to the first magnetic field generator 11 may also change along the Z-axis direction.

The magnetic sensor 20 may detect a magnetic field to be detected MF at a predetermined detection position where the magnetic sensor 20 is disposed. Hereinafter, the "magnetic field to be detected" will be referred to as a "detection-target magnetic field". The magnetic sensor 20 generates a detection signal corresponding to the direction of the detection-target magnetic field MF. The magnetic sensor 20 may be fixed to the substrate 7 and located near both of the end face 31A1 of the magnet 31A and the end face 34A1 of the magnet 34A. As will be described later, a distance from the magnet 31A to the magnetic sensor 20 and a distance from the magnet 34A to the magnetic sensor 20 are different from each other. The magnet 13 may be disposed above the magnetic sensor 20, for example.

Figure 6:
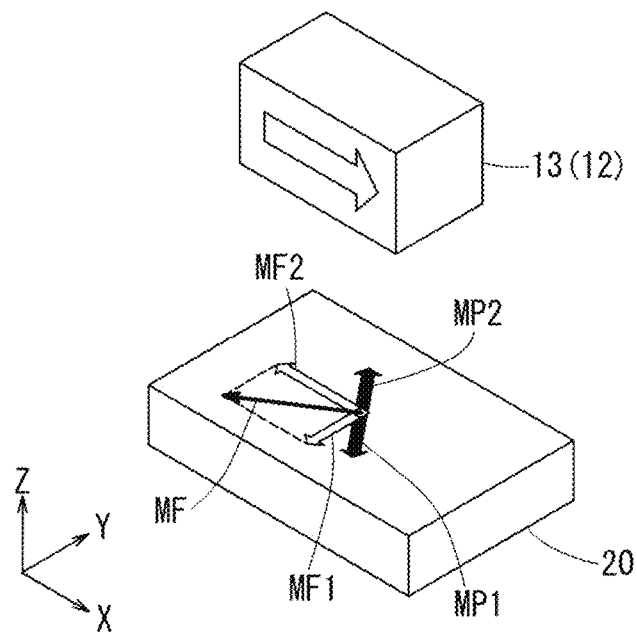
FIG. 6 is a schematic perspective view of a portion of the position detection unit illustrated in FIG. 1.
Figure 10A:
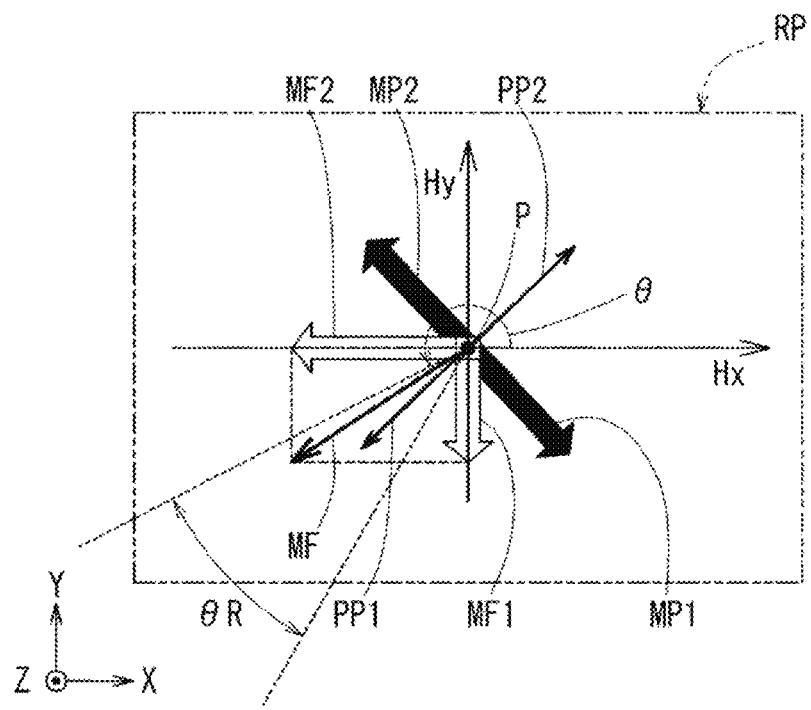
FIG. 10A is an explanatory diagram illustrating a first magnetic field, a second magnetic field, and a detection-target magnetic field (i.e., a magnetic field to be detected) at the position detection unit illustrated in FIG. 1.

In the present example embodiment, the predetermined detection position may be the position where the magnetic sensor 20 is disposed. Upon a change in the position of the second magnetic field generator 12 with respect to the position of the first magnetic field generator 11 as described above, a distance between the predetermined detection position and the second magnetic field generator 12 may change. The detection-target magnetic field may be a composite magnetic field MF of the first magnetic field MF1 and the second magnetic field MF2 at the detection position. The magnetic sensor 20 is configured to detect a positional change of the second magnetic field generator 12 by detecting the composite magnetic field MF. The first magnetic field MF1 and the second magnetic field MF2 are illustrated in FIG. 6 to be described later. The composite magnetic field MF is illustrated in FIG. 10A to be described later. Positional relationships between the first magnetic field generator 11, the second magnetic field generator 12, and the magnetic sensor 20, and a configuration of the magnetic sensor 20 will be described in detail later.

The drive unit 3 may include the magnets 31A and 34A, magnets 31B, 32A, 32B, 33A, 33B, and 34B, and the coils 41, 42, 43, 44, 45, and 46. As illustrated in FIGS. 1 and 2, the magnet 31A may be located in the −V direction as viewed from the lens 5. The magnet 32A may be located in a +V direction as viewed from the lens 5. The magnet 33A may be located in a −U direction as viewed from the lens 5. The magnet 34A may be located in the +U direction as viewed from the lens 5. That is, in the drive unit 3, the magnets 31A, 32A, 33A, and 34A may be arranged at four sides of a square or rectangular region along the top surface 7a of the substrate 7, for example. The magnets 31B, 32B, 33B, and 34B may be located above, i.e., in the +Z direction from the magnets 31A, 32A, 33A, and 34A, respectively. Further, the magnets 31A, 31B, 32A, 32B, 33A, 33B, 34A, and 34B may be held by the first holding member 14.

As illustrated in FIG. 3, the magnets 31A, 31B, 32A, and 32B may each have a rectangular parallelepiped shape with the direction of the length thereof along the U-axis direction. The magnets 33A, 33B, 34A, and 34B may each have a rectangular parallelepiped shape with the direction of the length thereof along the V-axis direction. The magnets 31A and 32B may each have a magnetization in the +V direction. The magnets 31B and 32A may each have a magnetization in the −V direction. The magnets 33A and 34B may each have a magnetization in the +U direction. The magnets 33B and 34A may each have a magnetization in the −U direction.

In FIG. 5, arrows drawn in the magnets 31A and 31B indicate the magnetization directions of the magnets 31A and 31B, respectively.

As illustrated in FIGS. 1 and 2, the coil 41 may be disposed between the magnet 31A and the substrate 7. The coil 42 may be disposed between the magnet 32A and the substrate 7. The coil 43 may be disposed between the magnet 33A and the substrate 7. The coil 44 may be disposed between the magnet 34A and the substrate 7. The coil 45 may be disposed between the lens 5 and the magnets 31A and 31B. The coil 46 may be disposed between the lens 5 and the magnets 32A and 32B. Further, the coils 41, 42, 43, and 44 may each be fixed to the substrate 7. The coils 45 and 46 may each be fixed to the second holding member 15.

The coil 41 may be subjected to a magnetic field occurring from the magnet 31A. The coil 42 may be subjected to a magnetic field occurring from the magnet 32A. The coil 43 may be subjected to a magnetic field occurring from the magnet 33A. The coil 44 may be subjected to a magnetic field occurring from the magnet 34A.

As illustrated in FIGS. 2, 4, and 5, the coil 45 may include a first conductor 45A extending along the U-axis along which the magnet 31A may extend, a second conductor 45B extending along the U-axis along which the magnet 31B may extend, and two third conductors 45C and 45D coupling the first conductor 45A and the second conductor 45B to each other. Further, as illustrated in FIG. 4, the coil 46 may include a first conductor 46A extending along the U-axis along which the magnet 32A may extend, a second conductor 46B extending along the U-axis along which the magnet 32B may extend, and two third conductors 46C and 46D coupling the first conductor 46A and the second conductor 46B to each other.

The first conductor 45A of the coil 45 may be subjected to a +V direction component of the magnetic field occurring from the magnet 31A. The second conductor 45B of the coil 45 may be subjected to a −V direction component of a magnetic field occurring from the magnet 31B. The first conductor 46A of the coil 46 may be subjected to a −V direction component of the magnetic field occurring from the magnet 32A. The second conductor 46B of the coil 46 may be subjected to a +V direction component of a magnetic field occurring from the magnet 32B.

The drive unit 3 may further include four magnetic sensors 30 located on respective inner sides of the coils 41 to 44 and fixed to the substrate 7. As will be described later, the four magnetic sensors 30 may be used in changing the position of the lens 5 in order to reduce an influence of a hand-induced apparatus shake.

The magnetic sensor 30 located inside the coil 41 may detect the magnetic field occurring from the magnet 31A and may generate a signal corresponding to the position of the magnet 31A. The magnetic sensor 30 located inside the coil 42 may detect the magnetic field occurring from the magnet 32A and may generate a signal corresponding to the position of the magnet 32A. The magnetic sensor 30 located inside the coil 43 may detect the magnetic field occurring from the magnet 33A and may generate a signal corresponding to the position of the magnet 33A. The magnetic sensor 30 located inside the coil 44 may detect the magnetic field occurring from the magnet 34A and may generate a signal corresponding to the position of the magnet 34A. The magnetic sensors 30 may each include an element that detects a magnetic field, such as a Hall element. It is to be noted that the drive unit 3 may include only one of the magnetic sensor 30 located inside the coil 41 and the magnetic sensor 30 located inside the 42. Likewise, the drive unit 3 may include only one of the magnetic sensor 30 located inside the coil 43 and the magnetic sensor 30 located inside the coil 44.

Next, the positional relationships between the first magnetic field generator 11, the second magnetic field generator 12, and the magnetic sensor 20 will be described in detail with reference to FIGS. 3 and 6. FIG. 6 is a perspective view of a portion of the position detection unit 1. Here, a +X direction and a +Y direction are defined as illustrated in FIG. 6. Both the +X direction and the +Y direction are parallel to the top surface 7a (see FIG. 2) of the substrate 7. The +X direction is a direction 45° rotated from the +U direction toward the +V direction. The +Y direction is a direction 45° rotated from the +V direction toward the −U direction. Further, a direction opposite to the +X direction is denoted as a −X direction, and a direction opposite to the +Y direction is denoted as a −Y direction.

Each of the +X direction and the −X direction, that is, a direction parallel to the X-axis, may correspond to a specific but non-limiting example of a "first direction" according to one embodiment of the technology.

In FIG. 6, an arrow with a reference sign MF1 represents the first magnetic field MF1 at the detection position. In the present example embodiment, the first magnetic field generator 11 and the magnetic sensor 20 may be arranged to cause the first magnetic field MF1 at the detection position to be in the −Y direction. The direction of the first magnetic field MF1 at the detection position may be adjustable by, for example, relative positions of the magnets 31A and 34A with respect to the magnetic sensor 20 and orientations of the magnets 31A and 34A with respect to the magnetic sensor 20. In some embodiments, the magnets 31A and 34A may be arranged symmetrically about a YZ plane including the detection position.

In FIG. 6, an arrow with a reference sign MF2 represents the second magnetic field MF2 at the detection position, and an arrow drawn in the magnet 13 represents the magnetization direction of the magnet 13. The second magnetic field MF2 may have a direction different from that of the first magnetic field MF1.

The direction of the detection-target magnetic field MF may be different from both of the direction of the first magnetic field MF1 and the direction of the second magnetic field MF2, and may lie therebetween. The direction of the detection-target magnetic field MF may have a variable range of less than 180°. In the present example embodiment, the direction of the second magnetic field MF2 may be the −X direction orthogonal to the direction of the first magnetic field MF1. In such a case, the variable range of the direction of the detection-target magnetic field MF is less than 90°.

Figure 7:
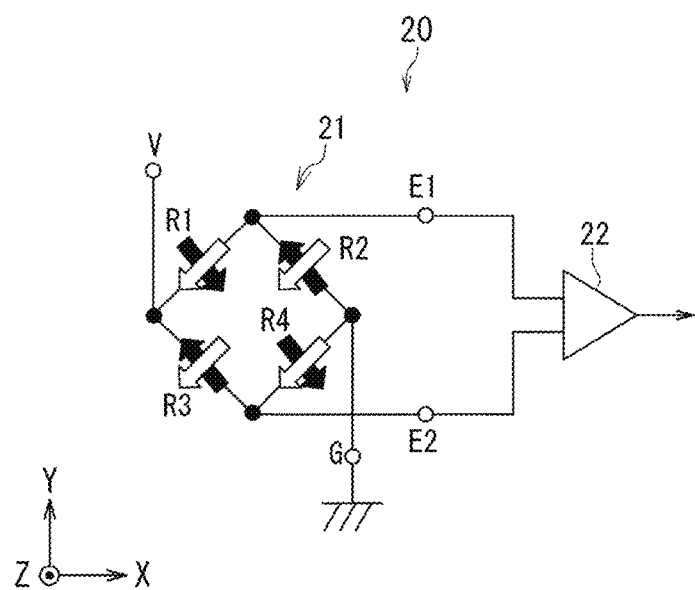
FIG. 7 is a circuit diagram illustrating a circuit configuration of a magnetic sensor in the position detection unit illustrated in FIG. 1.

Next, a configuration of the magnetic sensor 20 will be described with reference to FIG. 7. FIG. 7 is a circuit diagram illustrating an example configuration of the magnetic sensor 20. In the present example embodiment, the magnetic sensor 20 may be configured to generate, as the detection signal corresponding to the direction of the detection-target magnetic field MF, a detection signal corresponding to an angle that the direction of the detection-target magnetic field MF forms with respect to a reference direction. In the present example embodiment, the reference direction may be the +X direction.

As illustrated in FIG. 7, the magnetic sensor 20 may include a Wheatstone bridge circuit 21 and a difference detector 22. The Wheatstone bridge circuit 21 may include: a power supply port V; a ground port G; two output ports E1 and E2; a first resistor R1 and a second resistor R2 coupled in series to each other; and a third resistor R3 and a fourth resistor R4 coupled in series to each other. A first end of the first resistor R1 and a first end of the third resistor R3 may be coupled to the power supply port V. A second end of the first resistor R1 may be coupled to a first end of the second resistor R2 and the output port E1. A second end of the third resistor R3 may be coupled to a first end of the fourth resistor R4 and the output port E2. A second end of the second resistor R2 and a second end of the fourth resistor R4 may be coupled to the ground port G. The ground port V may receive a power supply voltage of a predetermined magnitude. The ground port G may be coupled to a ground.

In the present example embodiment, the first to fourth resistors R1 to R4 may each include two or more magnetoresistive effect (MR) elements coupled in series to each other. The two or more MR elements may each be a spin-valve MR element. The spin-valve MR element may include a magnetization pinned layer, a free layer, and a nonmagnetic layer disposed between the magnetization pinned layer and the free layer. The magnetization pinned layer has a magnetization pinned in a certain direction. The free layer is a magnetic layer having a magnetization that changes its direction in accordance with the direction of the detection-target magnetic field. The spin-valve MR element may be a tunneling magnetoresistive effect (TMR) element or a giant magnetoresistive effect (GMR) element. In the TMR element, the nonmagnetic layer is a tunnel barrier layer. In the GMR element, the nonmagnetic layer is a nonmagnetic electrically-conductive layer. The spin-valve MR element changes in resistance in accordance with an angle that the magnetization direction of the free layer forms with respect to the magnetization direction of the magnetization pinned layer. The resistance of the spin-valve MR element is at a minimum value in a case where the foregoing angle is 0°, and at a maximum value in a case where the foregoing angle is 18020 . In FIG. 7, the filled arrows each indicate the magnetization direction of the magnetization pinned layer of the MR element, and the hollow arrows each indicate the magnetization direction of the free layer of the MR element.

The magnetization pinned layers of the MR elements included in each of the first resistor R1 and the fourth resistor R4 have their magnetizations in a direction denoted by a reference sign MP1 (hereinafter, "direction MP1") in FIG. 6. The magnetization pinned layers of the MR elements included in each of the second resistor R2 and the third resistor R3 have their magnetizations in a direction opposite to the direction MP1, i.e., a direction denoted by a reference sign MP2 (hereinafter, "direction MP2") in FIG. 6. In the present example embodiment, in a reference plane, two directions orthogonal to the direction MP1 are each different from both of the direction of the first magnetic field MF1 and the direction of the second magnetic field MF2. In the reference plane, two directions orthogonal to the direction MP2 are the same as the two directions orthogonal to the direction MP1. Therefore, in the reference plane, the two directions orthogonal to the direction MP2 are also each different from both of the direction of the first magnetic field MF1 and the direction of the second magnetic field MF2. A potential at the output port E1, a potential at the output port E2, and a potential difference between the output ports E1 and E2 each change in accordance with a cosine of the angle that the direction of the detection-target magnetic field MF forms with respect to the direction MP1. The difference detector 22 may output a signal corresponding to the potential difference between the output ports E1 and E2 as the detection signal. The detection signal depends on the potential at the output port E1, the potential at the output port E2, and the potential difference between the output ports E1 and E2. Further, the detection signal changes in accordance with the direction of the detection-target magnetic field MF. Therefore, the detection signal is a signal corresponding to the direction of the detection-target magnetic field MF.

Considering, for example, the degree of accuracy with which the MR elements are fabricated, the magnetization directions of the magnetization pinned layers in the MR elements may slightly differ from the above-described directions.

Figure 8:
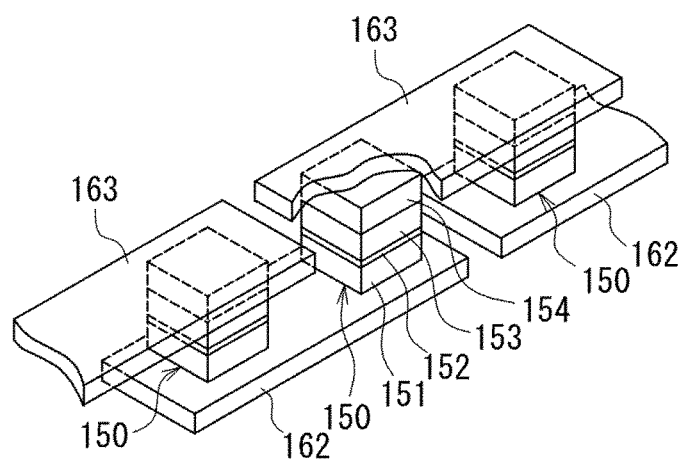
FIG. 8 is a perspective view of a portion of a resistor in FIG. 7.

An example configuration of the first to fourth resistors R1 to R4 will now be described with reference to FIG. 8. FIG. 8 is a perspective view of a portion of one resistor in the magnetic sensor 20 illustrated in FIG. 7. In this example, the resistor may include two or more lower electrodes 162, two or more magnetoresistive effect (MR) elements 150, and two or more upper electrodes 163. The lower electrodes 162 may be disposed on a substrate (not illustrated). The lower electrodes 162 may each have a long slender shape. Every two lower electrodes 162 adjacent to each other in the direction of the length thereof may have a gap therebetween. As illustrated in FIG. 8, two MR element 150 may be disposed on the top surface of each lower electrode 162 at positions near opposite ends of the lower electrode 162 in the direction of the length thereof. The MR elements 150 may each include, for example, a magnetization free layer 151, a nonmagnetic layer 152, a magnetization pinned layer 153, and an antiferromagnetic layer 154 that are staked in this order from the lower electrode 162 side. The magnetization free layer 151 may be electrically coupled to the lower electrode 162. The antiferromagnetic layer 154 includes an antiferromagnetic material. The antiferromagnetic layer 154 may be exchange-coupled to the magnetization pinned layer 153 to thereby pin the magnetization direction of the magnetization pinned layer 153. The upper electrodes 163 may be disposed on the MR elements 150. The upper electrodes 163 may each have a long slender shape, and may electrically couple the respective antiferromagnetic layers 154 of two adjacent MR elements 150 that are disposed on two lower electrodes 162 adjacent to each other in the direction of the lengths of the lower electrodes 162. With such a configuration, the resistor illustrated in FIG. 8 may include the two or more MR elements 150 coupled in series to each other by the two or more lower electrodes 162 and the two or more upper electrodes 163. It is to be noted that the magnetization free layer 151, the nonmagnetic layer 152, the magnetization pinned layer 153, and the antiferromagnetic layer 154 in the MR element 150 may be stacked in the reverse order to that illustrated in FIG. 8.

Figure 9:
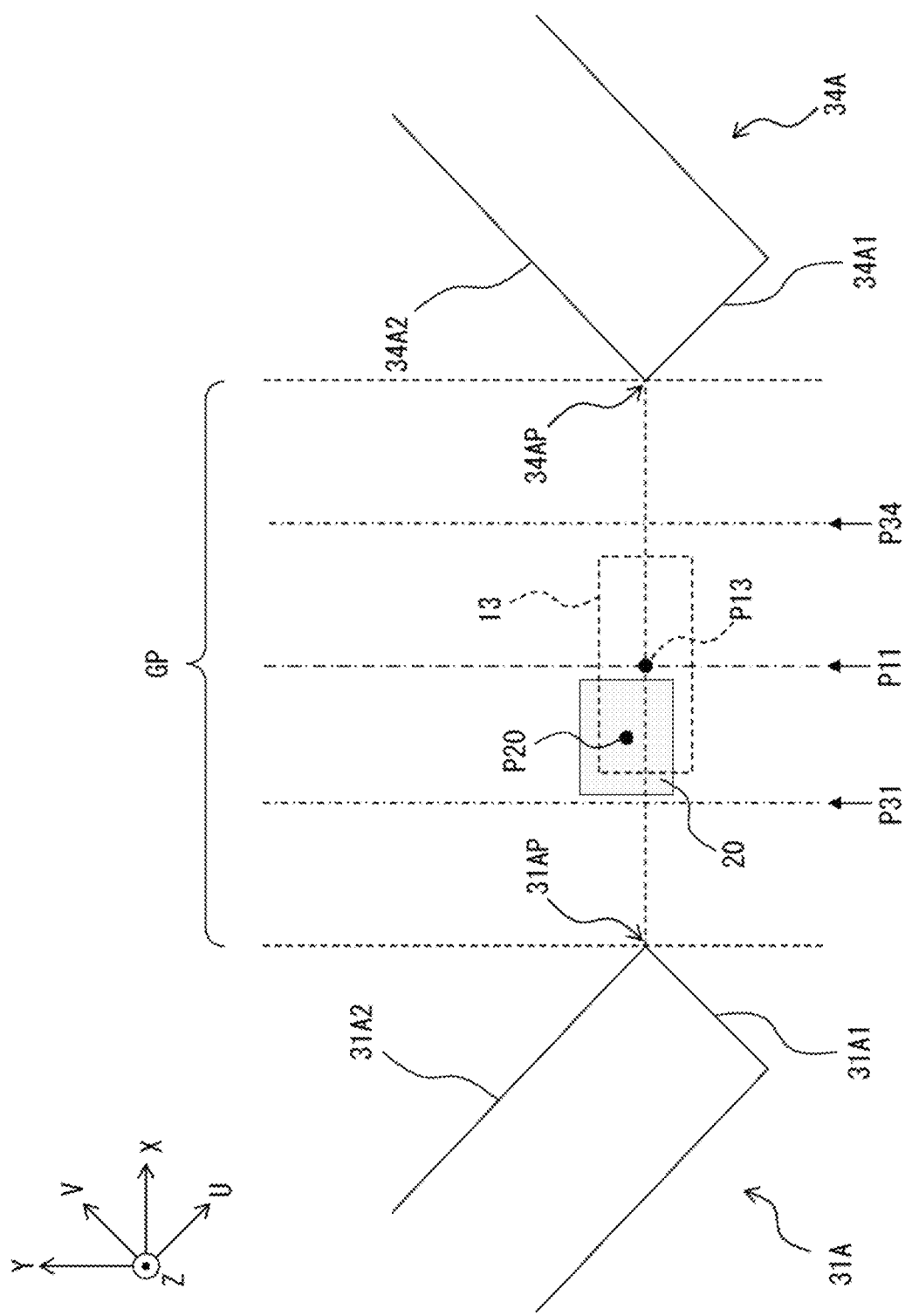
FIG. 9 is an enlarged planar diagram illustrating details of a positional relationship between a first magnetic field generator and the magnetic sensor in the position detection unit illustrated in FIG. 1.

Next, reference is made to FIG. 9 to describe a positional relationship between the magnetic sensor 20 and the magnets 31A and 34A of the first magnetic field generator 11 in detail. FIG. 9 is a schematic planar diagram illustrating the positional relationship between the magnetic sensor 20 and the magnets 31A and 34A along the top surface 7a orthogonal to the Z-axis.

As illustrated in FIG. 9, in the X-axis direction, a center position P20 of the magnetic sensor 20 lies at a position in a region GP between the magnet 31A and the magnet 34A other than a midpoint position P11 between the magnet 31A and the magnet 34A. The midpoint position P11 refers to a position on a line that is located at equal distances from a vertex 31AP (described later) and a vertex 34AP (described later). In some embodiments, in the X-axis direction, the entire magnetic sensor 20 may be disposed at a position in the region GP other than the midpoint position P11. Further, the magnet 13 of the second magnetic field generator 12 may be disposed at the midpoint position P11 between the magnets 31A and 34A in the X-axis direction. Here, the phrase "the magnet 13 . . . may be disposed at the midpoint position P11 between the magnets 31A and 34A in the X-axis direction" is intended to mean that, in the X-axis direction, the magnet 13 may be disposed in the region GP, with a portion of the magnet 13 lying at the midpoint position P11. In some embodiments, a center position P13 of the magnet 13 of the second magnetic field generator 12 in the X-axis direction may lie at the midpoint position P11 in the X-axis direction.

The magnet 31A may include the end face 31A1 along the V-axis direction, a side surface 31A2 forming an angle of 90°±5° with respect to the end face 31A1, and the vertex 31AP where the end face 31A1 and the side surface 31A2 meet. The magnet 34A may include the end face 34A1 along the U-axis direction, a side surface 34A2 forming an angle of 90°±5° with respect to the end face 34A1, and the vertex 34AP where the end face 34A1 and the side surface 34A2 meet. Thus, the end face 31A1 and the end face 34A1 may form an angle of 90°±5° with respect to each other; and the side surface 31A2 and the side surface 34A2 may form an angle of 90°±5° with respect to each other. The end faces 31A1 and 34A1 and the side surfaces 31A2 and 34A2 may all be substantially perpendicular to the top surface 7a. The magnets 31A and 34A may be arranged in orientations that allow a distance from the magnetic sensor 20 to the magnet 31A and a distance from the magnetic sensor 20 to the magnet 34A to be smallest at the vertexes 31AP and 34AP, respectively.

The end faces 31A1 and 34A1 may each correspond to a specific but non-limiting example of a "first plane" according to one embodiment of the technology. The side surfaces 31A2 and 34A2 may each correspond to a specific but non-limiting example of a "second plane" according to one embodiment of the technology.

In some embodiments, the position detection unit 1 may satisfy the following expression (1):

$$0<D<(G\times 2/5) \qquad (1)$$

where D represents a distance from the midpoint position P11 between the vertex 31AP of the magnet 31A and the vertex 34AP of the magnet 34A in the X-axis direction to the center position P20 of the magnetic sensor 20 in the X-axis direction, and G represents a distance between the vertex 31AP of the magnet 31A and the vertex 34AP of the magnet 34A in the X-axis direction.

Further, in some embodiments, the position detection unit 1 may satisfy the following expression (2):

$$(G/6)<D<(G/3) \qquad (2).$$

Next, operations of the drive unit 3 will be described with reference to FIGS. 1 to 5. To begin with, the optical image stabilization mechanism and the autofocus mechanism will be described briefly. The drive unit 3 may constitute a portion of each of the optical image stabilization mechanism and the autofocus mechanism. The drive unit 3, the optical image stabilization mechanism, and the autofocus mechanism may be controlled by a controller 4 (see FIG. 1) provided outside the imaging apparatus 100.

The optical image stabilization mechanism may be configured to detect a hand-induced apparatus shake using, for example, a gyro sensor outside the imaging apparatus 100. Upon detection of a hand-induced apparatus shake by the optical image stabilization mechanism, the controller 4 may control the drive unit 3 to change a relative position of the lens 5 with respect to the substrate 7 in accordance with the mode of the apparatus shake. This makes it possible to stabilize the absolute position of the lens 5 to thereby reduce an influence of the apparatus shake. It is to be noted that the relative position of the lens 5 with respect to the substrate 7 may change either in a direction parallel to the U-axis or in a direction parallel to the V-axis, depending on the mode of the apparatus shake.

The autofocus mechanism may be configured to detect an in-focus state of a subject using, for example, the image sensor 200 or an autofocus sensor. The controller 4 may cause the drive unit 3 to change the relative position of the lens 5 with respect to the substrate 7 along the Z-axis to bring the subject into focus. It is thereby possible to achieve automatic focusing on the subject.

Next, a description will be given of an operation of the drive unit 3 related to the optical image stabilization mechanism. Upon passage of electric currents through the coils 41 and 42 by the controller 4, an interaction between the magnetic fields occurring from the magnets 31A and 32A and magnetic fields occurring from the coils 41 and 42 causes the first holding member 14 with the magnets 31A and 32A fixed thereto to move along the V-axis. As a result, the lens 5 also moves along the V-axis. Upon passage of electric currents through the coils 43 and 44 by the controller 4, an interaction between the magnetic fields occurring from the magnets 33A and 34A and magnetic fields occurring from the coils 43 and 44 causes the first holding member 14 with the magnets 33A and 34A fixed thereto to move along the U-axis. As a result, the lens 5 also moves along the U-axis. The controller 4 may detect the position of the lens 5 by measuring signals corresponding to the positions of the magnets 31A, 32A, 33A, and 34A generated by the magnetic sensors 30.

Next, an operation of the drive unit 3 related to the autofocus mechanism will be described. In a case of moving the relative position of the lens 5 with respect to the substrate 7 along the Z-axis, the controller 4 may pass an electric current through the coil 45 to cause the electric current to flow through the first conductor 45A in the +U direction and flow through the second conductor 45B in the −U direction. The controller 4 may further pass an electric current through the coil 46 to cause the electric current to flow through the first conductor 46A in the −U direction and flow through the second conductor 46B in the +U direction. These electric currents and the magnetic fields occurring from the magnets 31A, 31B, 32A, and 32B cause a Lorentz force in the +Z direction to be exerted on the first conductor 45A and the second conductor 45B of the coil 45 and on the first conductor 46A and the second conductor 46B of the coil 46. This causes the second holding member 15 with the coils 45 and 46 fixed thereto to move in the +Z direction. As a result, the lens 5 also moves in the +Z direction.

In a case of moving the relative position of the lens 5 with respect to the substrate 7 in the −Z direction, the controller 4 may pass electric currents through the coils 45 and 46 in directions opposite to those in the case of moving the relative position of the lens 5 with respect to the substrate 7 in the +Z direction.

Workings and Effects of Imaging Apparatus 100

Next, workings and effects of the position detection unit 1 and the imaging apparatus 100 including the same according to the present example embodiment will be described. The position detection unit 1 according to the present example embodiment may be used to detect the position of the lens 5. In the present example embodiment, in the case where the relative position of the lens 5 with respect to the substrate 7 changes, the relative position of the second holding member 15 with respect to the substrate 7 and the first holding member 14 also changes. As described above, the first holding member 14 may hold the first magnetic field generator 11, and the second holding member 15 may hold the second magnetic field generator 12. Accordingly, a change in the relative position of the lens 5 may cause a change in the relative position of the second magnetic field generator 12 with respect to the first magnetic field generator 11, as described above. In the present example embodiment, the relative position of the second magnetic field generator 12 with respect to the first magnetic field generator 11 may change along the direction of the optical axis of the lens 5, that is, along a direction parallel to the Z-axis.

Upon a change in the relative position of the second magnetic field generator 12 with respect to the first magnetic field generator 11, a relative position of the second magnetic field generator 12 with respect to the substrate 7 changes, although a relative position of the first magnetic field generator 11 with respect to the substrate 7 does not change. Accordingly, upon a change in the relative position of the second magnetic field generator 12 with respect to the first magnetic field generator 11, an intensity of the second magnetic field MF2 changes, although none of an intensity and the direction of the first magnetic field MF1 and the direction of the second magnetic field MF2 change. A change in the intensity of the second magnetic field MF2 changes the direction and intensity of the detection-target magnetic field MF, and accordingly, changes a value of the detection signal to be generated by the magnetic sensor 20. The value of the detection signal to be generated by the magnetic sensor 20 changes in a manner dependent on the relative position of the second magnetic field generator 12 with respect to the substrate 7. The controller 4 may be configured to measure the detection signal from the magnetic sensor 20 to thereby detect the relative position of the second magnetic field generator 12 with respect to the substrate 7. The relative position of the second magnetic field generator 12 with respect to the substrate 7 indicates the relative position of the lens 5 with respect to the substrate 7.

Reference is now made to FIG. 10A to describe the directions MP1 and MP2 and the first and second magnetic fields MF1 and MF2 in detail. In FIG. 10A, a reference sign RP denotes the reference plane, and a reference sign P denotes the detection position. In FIG. 10A, the first magnetic field MF1 is represented by an arrow with the reference sign MF1, the second magnetic field MF2 is represented by an arrow with the reference sign MF2, and the detection-target magnetic field MF is represented by an arrow with the reference sign MF. Further, in FIG. 10A, an axis in the X direction represents an intensity Hx of a magnetic field in the X direction, and an axis in the Y direction represents an intensity Hy of a magnetic field in the Y direction.

The detection-target magnetic field MF may be a composite magnetic field of the first magnetic field MF1 and the second magnetic field MF2. Therefore, the direction of the detection-target magnetic field MF may be different from both of the direction of the first magnetic field MF1 and the direction of the second magnetic field MF2, and may lie therebetween. In FIG. 10A, two directions orthogonal to the direction MP1 in the reference plane RP are denoted by reference signs PP1 and PP2. Two directions orthogonal to the direction MP2 in the reference plane RP are the same as the directions PP1 and PP2. As described above, in the present example embodiment, the directions PP1 and PP2 are each different from both of the direction of the first magnetic field MF1 and the direction of the second magnetic field MF2.

In FIG. 10A, a reference sign θ denotes an angle that the direction of the detection-target magnetic field MF forms with respect to the reference direction (the +X direction) as viewed in a counterclockwise direction from the reference direction (the +X direction). The angle θ described above will be referred to as a detection-target angle. The detection-target angle is an angle to be detected. The detection-target angle θ indicates the direction of the detection-target magnetic field MF. In the present example embodiment, the magnetic sensor 20 may generate the detection signal corresponding to the detection-target angle θ.

Figure 10B:
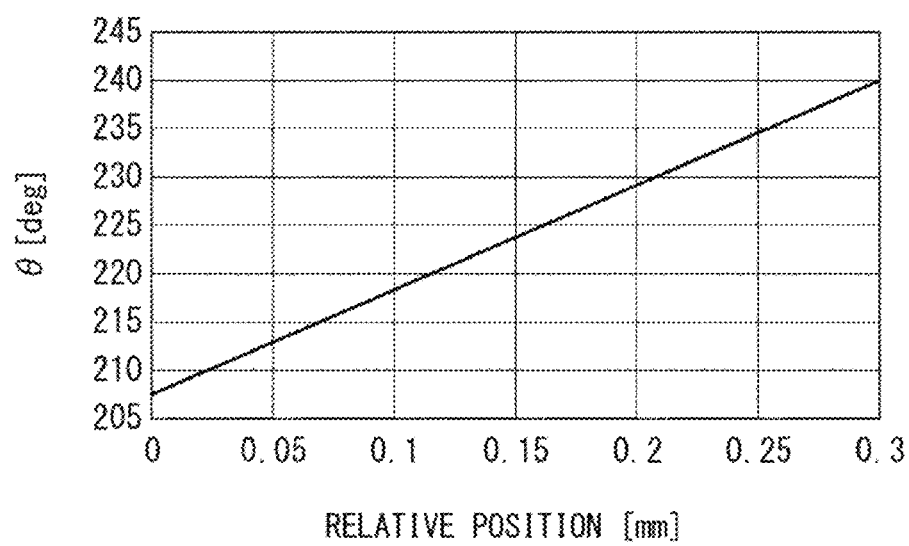
FIG. 10B is a characteristic diagram illustrating a relationship between a relative position of a lens with respect to a substrate and a detection-target angle (i.e., an angle to be detected) in the position detection unit illustrated in FIG. 1.

Reference is now made to FIG. 10B to describe a relationship between the relative position of the lens 5 with respect to the substrate 7 and the detection-target angle θ in the present example embodiment. FIG. 10B is a characteristic diagram illustrating the relationship between the relative position of the lens 5 with respect to the substrate 7 and the detection-target angle θ. In FIG. 10B, the horizontal axis represents the relative position of the lens 5 with respect to the substrate 7, and the vertical axis represents the detection-target angle θ.

In the present example embodiment, the relative position of the lens 5 with respect to the substrate 7 is expressed in a value of a distance from the detection position P to the second magnetic field generator 12 located at any position minus a shortest distance. The shortest distance refers to a distance from the detection position P to the second magnetic field generator 12 when the second magnetic field generator 12 is located closest to the detection position P. Here, by way of example, a movable range of the relative position of the lens 5 with respect to the substrate 7 is set to a range of 0 to 0.3 mm.

In the present example embodiment, as illustrated in FIG. 10B, the detection-target angle θ varies over a variable range of 207720 to 240° as the relative position of the lens 5 with respect to the substrate 7 varies over the movable range of 0 to 0.3 mm. The detection-target angle θ varies linearly in response to variations in the relative position of the lens 5 with respect to the substrate 7. The detection-target angle θ indicates the direction of the detection-target magnetic field MF. The variable range of the detection-target angle θ therefore corresponds to the variable range of the direction of the detection-target magnetic field MF that corresponds to the movable range of the relative position of the lens 5 with respect to the substrate 7. In FIG. 10A, a range denoted by a reference sign OR represents the variable range of the detection-target angle θ.

As illustrated in FIG. 10A, in the present example embodiment, the directions PP1 and PP2 orthogonal to the magnetization direction of the magnetization pinned layers in the reference plane RP are each different from both of the direction of the first magnetic field MF1 and the direction of the second magnetic field MF2. This enables the position detection unit 1 according to the present example embodiment to perform accurate position detection.

Figure 11:
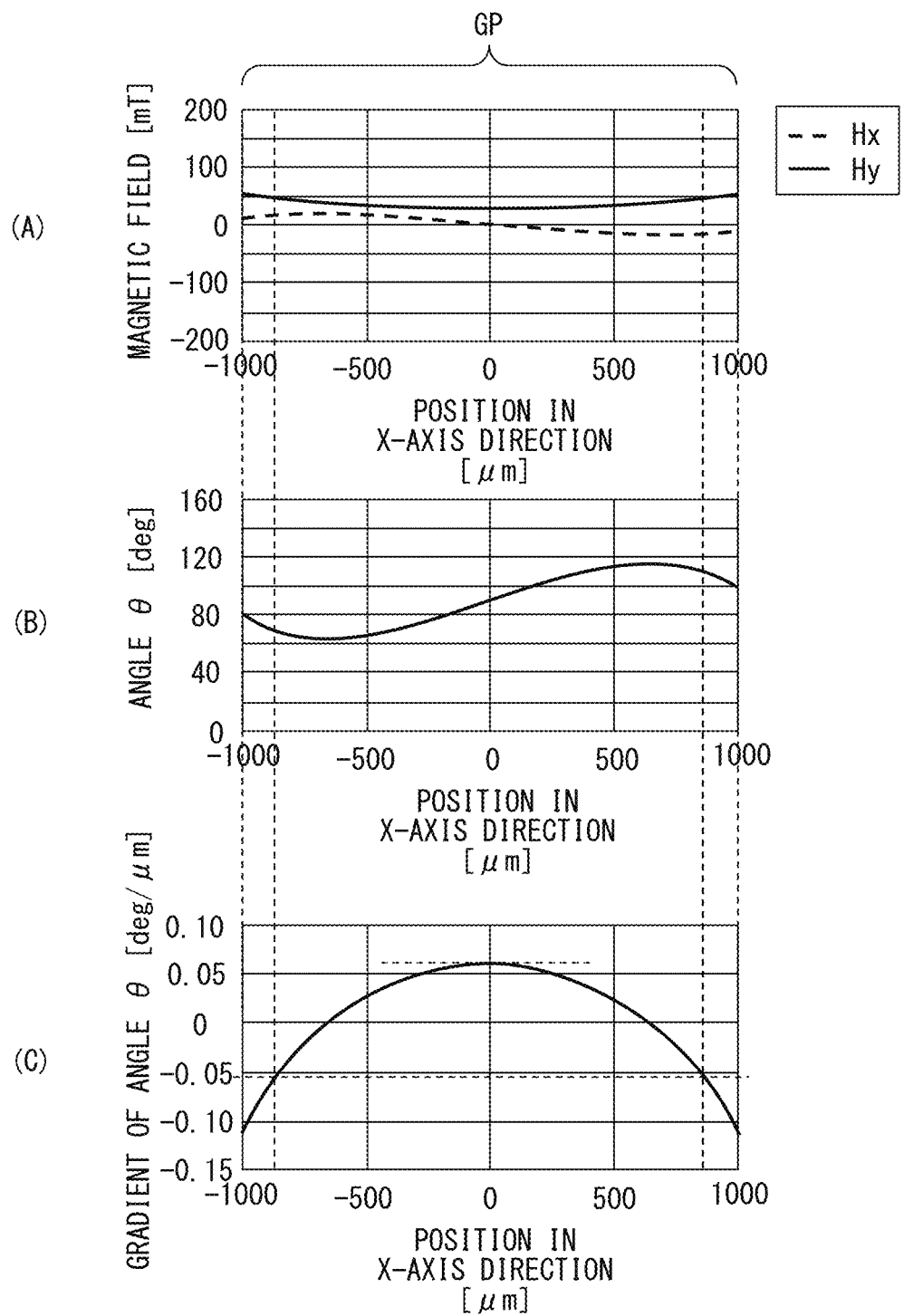
FIG. 11 is a characteristic diagram illustrating a relationship between a position in an X-axis direction and an intensity of the first magnetic field in the position detection unit illustrated in FIG. 1.

Further, in the present example embodiment, the center position P20 of the magnetic sensor 20 lies at a position in the region GP between the magnets 31A and 34A in the X-axis direction other than the midpoint position P11. This makes it possible to reduce an error of an output signal of the magnetic sensor 20 that can occur in a case where, for example, a relative position of the magnetic sensor 20 as actually installed (hereinafter, "implementation relative position") with respect to the magnets 31A and 34A becomes different from a relative position of the magnetic sensor 20 as designed (hereinafter, "design relative position") with respect to the magnets 31A and 34A. With reference to FIG. 11, a description will be given below of an influence of the relative position of the magnetic sensor 20 with respect to the magnets 31A and 34A on the first magnetic field MF1 to be applied to the magnetic sensor 20.

FIG. 11 is a characteristic diagram illustrating a position dependence of the intensity of the first magnetic field MF1 regarding the position detection unit 1 as an experiment example of the example embodiment of the technology. Part (A) at the top of FIG. 11 is a characteristic diagram illustrating a relationship between a position [μm] in the X-axis direction in the region GP and the intensity of the first magnetic field MF1 in the region GP. In the part (A) of FIG. 11, the dashed-line plot represents a magnetic field Hx, and the solid-line plot represents a magnetic field Hy. The magnetic fields Hx and Hy are an X-axis direction component and a Y-axis direction component, respectively, of the first magnetic field MF1 generated by the magnets 31A and 34A. Part (B) in the middle of FIG. 11 is a characteristic diagram illustrating how an angle θ [deg] between a direction of the magnetic field Hx, i.e., the X-axis direction component of the first magnetic field MF1, and a direction of the magnetic field Hy, i.e., the Y-axis direction component of the first magnetic field MF1, changed in accordance with the position [μm] in the X-axis direction in the region GP. Part (C) at the bottom of FIG. 11 is a characteristic diagram illustrating how a gradient of the angle θ [deg/μm] illustrated in part (B) of FIG. 11 changed in accordance with the position [θm] in the X-axis direction in the region GP. As illustrated in (A) of FIG. 11, the magnetic field Hx (the X-axis direction component of the first magnetic field MF1) and the magnetic field Hy (the Y-axis direction component of the first magnetic field MF1) each varied depending on the position in the X-axis direction. That is, as illustrated in (B) of FIG. 11, the orientation (the angle) of the first magnetic field MF1 being applied to the magnetic sensor 20 varied depending on the position of the magnetic sensor 20 in the X-axis direction. As illustrated in (C) of FIG. 11, the gradient of the variation was smaller in the vicinity of the midpoint position P11 than at the midpoint position P11 in the X-axis direction. Therefore, by setting the center position P20 of the magnetic sensor 20 to a position other than the midpoint position P11, it is possible to reduce an error of the output signal of the magnetic sensor 20 that can occur in the case where the implementation relative position of the magnetic sensor 20 becomes different from the design relative position thereof.

In a specific but non-limiting example, satisfying the foregoing expression (1) makes it possible to reduce a measurement error of the magnetic sensor 20 caused by misalignment of the magnetic sensor 20, as compared with a case where the center position P20 of the magnetic sensor 20 is intended to be located at the midpoint position P11. For example, by satisfying the foregoing expression (2), it is possible to further reduce the measurement error of the magnetic sensor 20.

Figure 12:
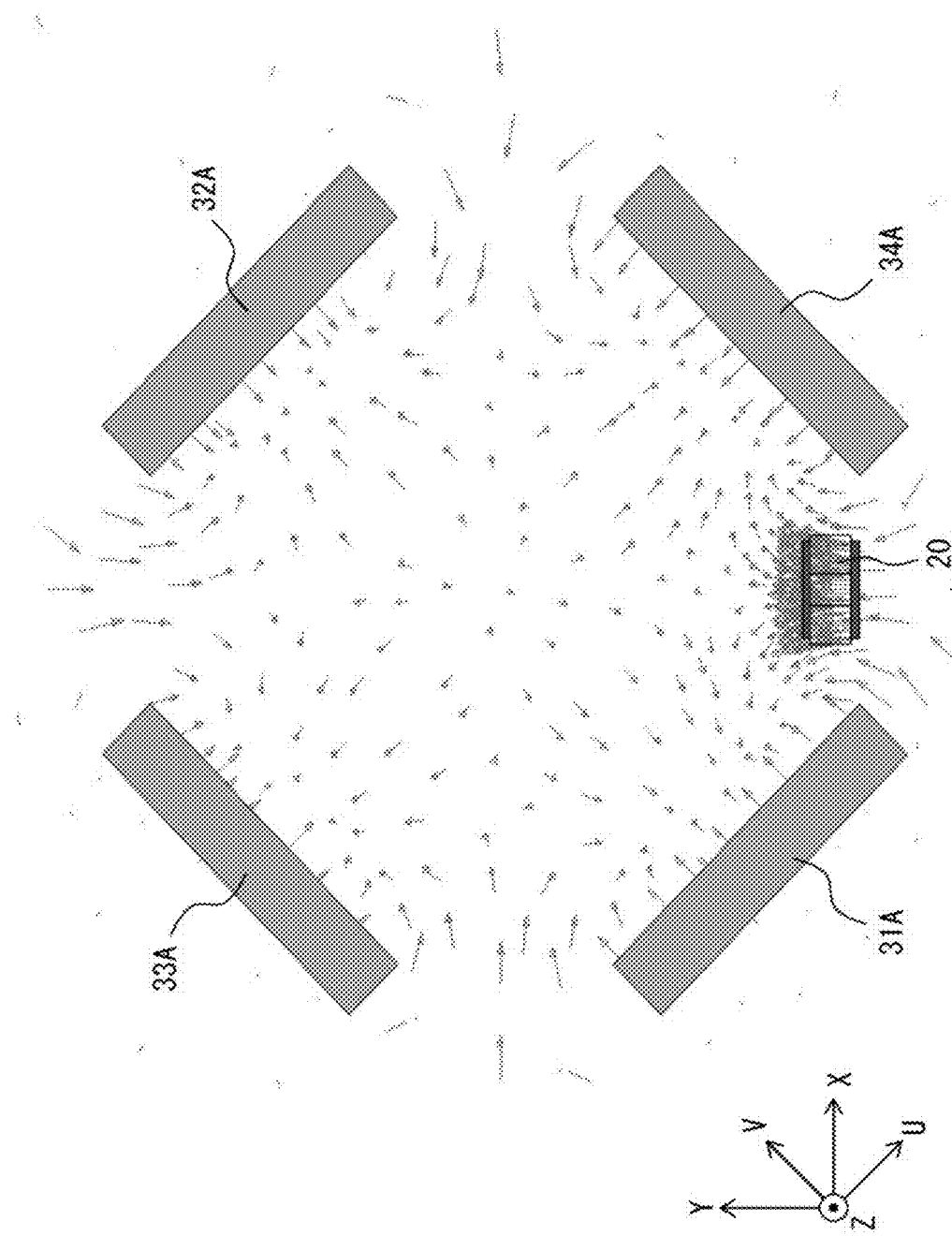
FIG. 12 is a schematic diagram illustrating a magnetic field distribution in an XY plane in the lens module illustrated in FIG. 1.

FIG. 12 is a schematic diagram illustrating an example of distribution of the first magnetic field MF1 in an XY plane in the lens module 300. As illustrated in FIG. 12, the magnets 31A to 34A may each be magnetized in a direction orthogonal to the direction of the length thereof. A magnetic flux passing through the magnetic sensor 20 may be oriented substantially in the Y-axis direction.

In the present example embodiment, the second magnetic field generator 12 may be disposed at the midpoint position P11 between the magnets 31A and 34A in the X-axis direction. This makes it easier to bring the position detection unit 1 as a whole into weight balance, thus making it easier for the lens 5 to maintain a desired orientation upon movement of the second magnetic field generator 12 in the Z-axis direction. To be more specific, for example, it is possible to reduce an inclination of the optical axis of the lens 5 with respect to the image sensor 20 to a low value. In a specific but non-limiting example, the center position P13 of the magnet 13 in the X-axis direction may coincide with the midpoint position P11. This makes it further easier to achieve the weight balance, thus helping to maintain the orientation of the lens 5 more accurately upon movement of the second magnetic field generator 12 in the Z-axis direction.

In the present example embodiment, the shape of the magnets 31A and 34A and the shape of the magnet 13 may be different from each other. This makes it possible to configure the magnet 13 of the second magnetic field generator 12 into a shape suitable for the magnetic sensor 20 to detect the position of the magnet 13 along the Z-axis while configuring the magnets 31A and 34A of the first magnetic field generator 11 into a shape suitable as a drive source to move the lens 5 along the Z-axis. In addition, in the present example embodiment, the first magnetic material used as a constituent material of the magnets 31A and 34A of the first magnetic field generator 11 and the second magnetic material used as a constituent material of the magnet 13 of the second magnetic field generator 12 may be different from each other. It is thus possible to approximate a thermal demagnetization rate of the magnets 31A and 34A of the first magnetic field generator 11 and a thermal demagnetization rate of the magnet 13 of the second magnetic field generator 12 to each other even if the shape of the magnets 31A and 34A and the shape of the magnet 13 are different from each other. This helps to suppress variations in the relative position of the second magnetic field generator 12 with respect to the first magnetic field generator 11 and the magnetic sensor 20 in the imaging apparatus 100 even in a case where a change in temperature occurs in an environment in which the position detection unit 1 is installed. In other words, a change in the ambient temperature less affects the accuracy of position detection for the lens 5 by the magnetic sensor 20, and it is thus possible to reduce temperature dependence of the accuracy of position detection for the lens 5 by the magnetic sensor 20. As a result, the imaging apparatus 100 according to the present example embodiment makes it possible to change the position of the lens 5 more accurately and to thereby acquire an image of better quality.

Further, in the present example embodiment, the second temperature coefficient of residual magnetic flux density that the magnet 13 has may be smaller in absolute value than the first temperature coefficient of residual magnetic flux density that the magnets 31A and 34A have. This makes it possible to further suppress a reduction in accuracy of position detection for the lens 5 by the magnetic sensor 20 associated with a change in the ambient temperature.

Figure 13A:
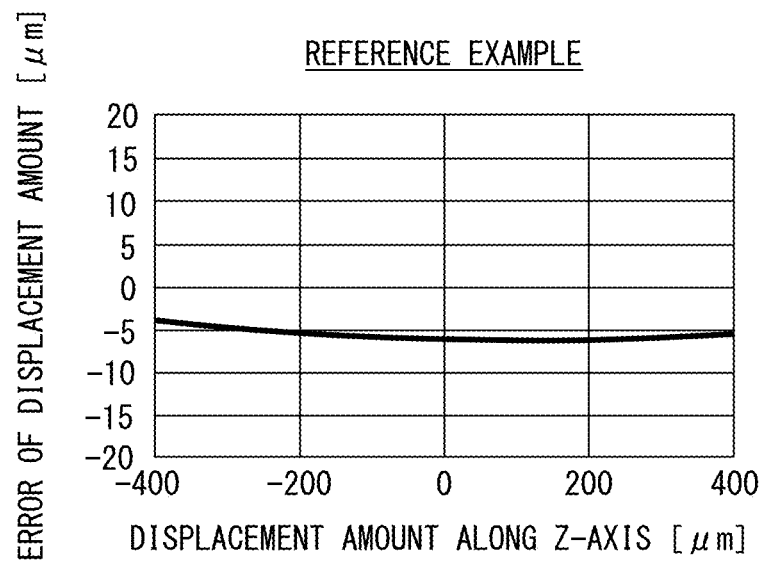
FIG. 13A is a characteristic diagram illustrating a detection error of a position detection unit according to a reference example.

FIG. 13A illustrates a temperature characteristic of a position detection unit according to a reference example. In FIG. 13A, the horizontal axis represents an actual displacement amount [μm] of the lens 5 along the Z-axis, and the vertical axis represents a largest error [μm] of a measured value with the position detection unit with respect to the actual displacement amount of the lens 5 along the Z-axis in a case where the ambient temperature varied in a range from 25° C. to 65° C. Regarding the displacement amount [μm] on the horizontal axis, a displacement in the +Z direction is represented by a positive value and a displacement in the −Z direction is represented by a negative value with respect to a reference position set at 0. In this reference example, NdFeB was used as a constituent material of the magnets 31A, 34A, and 13. Further, in the reference example, the magnets 31A and 34A each had a rectangular parallelepiped shape with dimensions of 7 mm in length×1 mm in width× 0.5 mm in thickness, and the magnet 13 had a rectangular parallelepiped shape with dimensions of 1 mm in length×0.8 mm in width×0.5 mm in thickness. As a result, the magnets 31A and 34A each had a thermal demagnetization rate of −3.5%, whereas the magnet 13 had a thermal demagnetization rate of −4.51%. As illustrated in FIG. 13A, it is seen that with the position detection unit according to the reference example, a largest error occurring upon displacement of the lens 5 in a range from −400 μm to +400 μm along the Z-axis was 6 μm.

Figure 13B:
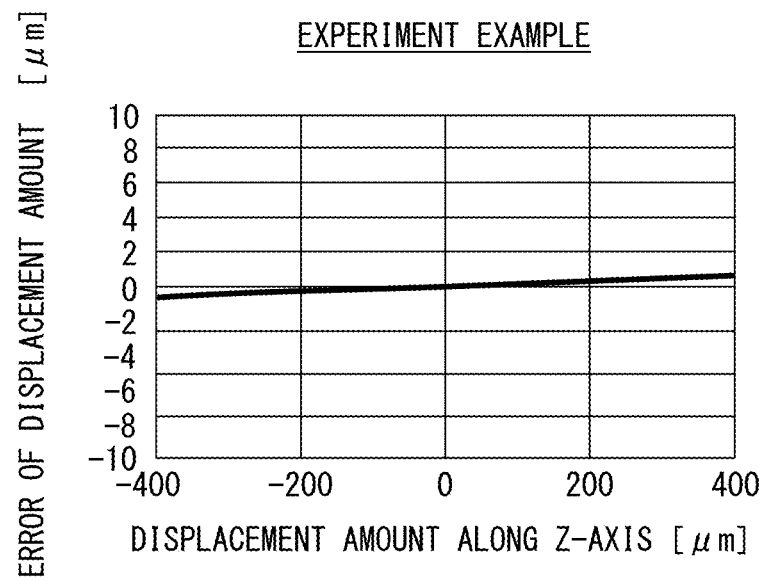
FIG. 13B is a characteristic diagram illustrating an experiment example of the detection error of the position detection unit illustrated in FIG. 1.

FIG. 13B illustrates an experiment example of a temperature characteristic of the position detection unit 1 of the present example embodiment. In FIG. 13B, the horizontal axis represents an actual displacement amount [μm] of the lens 5 along the Z-axis, and the vertical axis represents a largest error [μm] of a measured value with the position detection unit with respect to the actual displacement amount of the lens 5 along the Z-axis in the case where the ambient temperature varied in the range from 25° C. to 65° C. Regarding the displacement amount [μm] on the horizontal axis, similarly to FIG. 13A, a displacement in the +Z direction is represented by a positive value and a displacement in the −Z direction is represented by a negative value with respect to the reference position set at 0. In this experiment example, NdFeB was used as a constituent material of the magnets 31A and 34A, and SmCo was used as a constituent material of the magnet 13. Further, in this experiment example, the magnets 31A and 34A each had a rectangular parallelepiped shape with dimensions of 7 mm in length×1 mm in width×0.5 mm in thickness, and the magnet 13 had a rectangular parallelepiped shape with dimensions of 1 mm in length×0.8 mm in width ×0.5 mm in thickness. As a result, the magnets 31A and 34A each had a thermal demagnetization rate of −3.5%, and the magnet 13 also had a thermal demagnetization rate of −3.5%. As illustrated in FIG. 13B, it is seen that with this experiment example, a largest error occurring upon displacement of the lens 5 in the range from −400 μm to +400 μm along the Z-axis was as small as 0.6 μm.

2. Modification Examples

The technology has been described above with reference to the example embodiment. However, the technology is not limited thereto, and may be modified in a variety of ways. For example, the foregoing example embodiment has been described with reference to a case where four resistors are used to form a full-bridge circuit in the magnetic sensor. However, in some embodiments of the technology, for example, two resistors may be used to form a half-bridge circuit. Further, the magnetoresistive effect elements may be identical with each other or different from each other in shape and/or dimensions. The resistors may each include a magnetic detection element. As used herein, the term "magnetic detection element" refers to any element having a function of detecting a magnetic field, and may encompass not only a spin-valve MR element but also other elements including, without limitation, an anisotropic magnetoresistive effect (AMR) element and a Hall element (including a planar Hall element and a vertical Hall element). Typically, the planar Hall element tends to have a sensitive axis perpendicular to the substrate, and the magnetoresistive effect element and the vertical Hall element tend to have a sensitive axis parallel to the substrate. In one example embodiment of the technology, a magnetic detection element having a sensitive axis parallel to the substrate or to a plane orthogonal to the Z-axis may be used. The dimensions of components and the layouts of the components are merely illustrative, and are not limited thereto.

The position detection unit of an embodiment of the technology is not limited to a unit configured to detect the position of a lens but may be a unit configured to detect the position of any object other than a lens in a space.

In the foregoing example embodiment, the first magnet may generate the first magnetic field to be used as a drive source to drive the lens and the second holding member holding the lens. However, embodiments of the technology are not limited thereto. In some embodiments, the first magnet may be used, for example, as a bias magnet to apply a bias to a magnetoresistive effect element of a magnetic sensor.

In the position detection unit 1 of the foregoing example embodiment, mutually different materials may be selected as the first magnetic material to be included in the first magnet and the second magnetic material to be included in the second magnet, and mutually different shapes may be employed for the first magnet and the second magnet to thereby make the respective thermal demagnetization rates of the first magnet and the second magnet closer to each other. However, embodiments of the technology are not limited thereto. For example, the first magnet and the second magnet may include the same magnetic material (the first magnetic material) and have their respective permeance coefficients (a first permeance coefficient and a second permeance coefficient, respectively) substantially equal to each other. In such a case, for example, the shapes of the first magnet and the second magnet may be identical or similar to each other. With such a configuration, it is also possible to make the respective thermal demagnetization rates of the first magnet and the second magnet closer to each other. As a result, the respective temperature characteristics of the first magnet and the second magnet are approximated to each other, which makes it possible to reduce error of position detection accuracy.

In the foregoing example embodiment, the magnets 31A, 32A, 33A, and 34A may be arranged at four sides of a square or rectangular region along the top surface 7a of the substrate 7. However, embodiments of the technology are not limited thereto. For example, the magnets 31A, 32A, 33A, and 34A may be arranged at four corners of a square or rectangular region along the top surface 7a of the substrate 7, as in a lens module 300A according to a modification example illustrated in FIG. 14. In the lens module 300A, a direction along the U-axis may correspond to a specific but non-limiting example of the "first direction" according to one embodiment of the technology. In a case of the lens module 300A, the lens 5 may be disposed in a middle region surrounded by the magnets 31A, 32A, 33A, and 34A, and a coil C may be disposed in a gap between the lens 5 and the magnets 31A, 32A, 33A, and 34A, thus surrounding the lens 5. The magnets 31A, 32A, 33A, and 34A may each face an outer peripheral surface of a corresponding portion of the coil C, and may each be magnetized in a direction orthogonal to a direction in which the corresponding portion of the coil C extends. That is, the magnets 31A, 32A, 33A, and 34A may each be magnetized in a direction of an arrow drawn thereon in FIG. 14, or in a direction opposite thereto. The lens 5 and the coil C may be held together by a holding member. The lens 5 and the coil C held by the holding member may be interposed between a pair of flat springs in the Z-axis direction, and may be movable in the Z-direction by elastic deformation of the pair of flat springs. In the lens module 300A, the magnets 31A, 32A, 33A, and 34A may generate the first magnetic field crossing over the coil C along a UV plane. Upon supply of a drive current to the coil C, an induction magnetic field may be generated around the coil C to thereby cause the lens 5 and the coil C to be displaced along the Z-axis direction.

Figure 15:
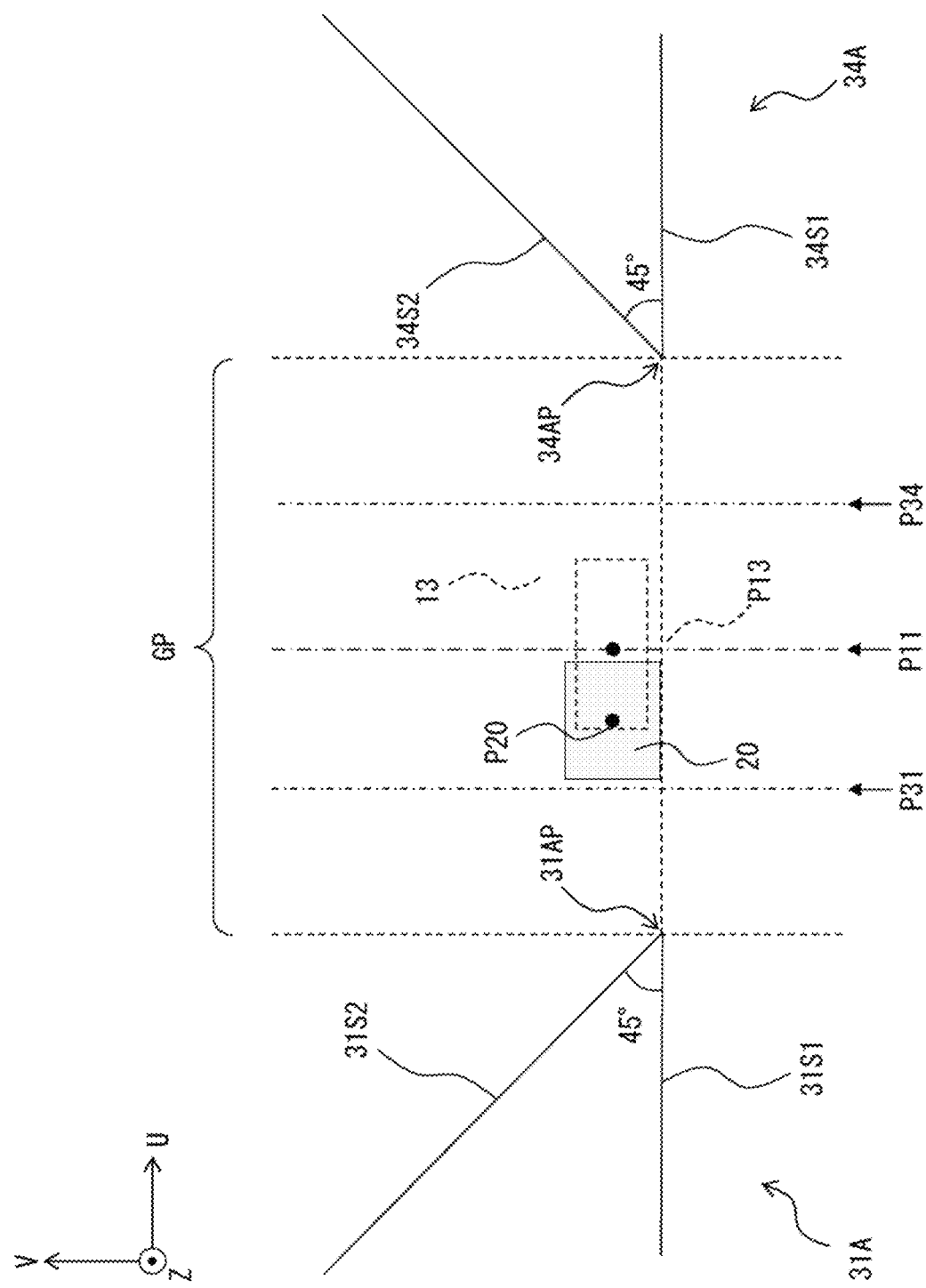
FIG. 15 is an enlarged planar diagram illustrating details of a positional relationship between the first magnetic field generator and the magnetic sensor in a position detection unit illustrated in FIG. 14.

Next, reference is made to FIG. 15 to describe the positional relationship between the magnetic sensor 20 and the magnets 31A and 34A in the lens module 300A in detail. FIG. 15 is a schematic planar diagram illustrating the positional relationship between the magnetic sensor 20 and the magnets 31A and 34A along the top surface 7a orthogonal to the Z-axis in the lens module 300A.

As illustrated in FIG. 15, in the U-axis direction, the center position P20 of the magnetic sensor 20 lies at a position in the region GP between the magnet 31A and the magnet 34A other than the midpoint position P11 between the magnet 31A and the magnet 34A. In some embodiments, in the U-axis direction, the entire magnetic sensor 20 may be disposed at a position in the region GP other than the midpoint position P11. Further, in the lens module 300A, the center position P20 of the magnetic sensor 20 in the U-axis direction may be located closer to the midpoint position P11 than to each of the magnets 31A and 34A. In other words, the center position P20 may be located between the midpoint position P11 and a midpoint position P31 between the midpoint position P11 and a vertex 31AP described later, or may be located between the midpoint position P11 and a midpoint position P34 between the midpoint position P11 and a vertex 34AP described later.

The magnet 31A may include an end face 31S1 along the U-axis direction, a side surface 31S2 forming an angle of 45°±5° with respect to the end face 31S1, and the vertex 31AP where the end face 31S1 and the side surface 31S2 meet. The magnet 34A may include an end face 34S1 along the U-axis direction, a side surface 34S2 forming an angle of 45°±5° with respect to the end face 34S1, and the vertex 34AP where the end face 34S1 and the side surface 34S2 meet. Thus, the end face 31S1 and the end face 34S1 may be substantially parallel to each other; and the side surface 31S2 and the side surface 34S2 may form an angle of 90°±5° with respect to each other. The end faces 31S1 and 34S1 and the side surfaces 31S2 and 34S2 may all be substantially perpendicular to the top surface 7a. The magnets 31A and 34A may be arranged in orientations that allow a distance from the magnetic sensor 20 to the magnet 31A and a distance from the magnetic sensor 20 to the magnet 34A to be smallest at the vertexes 31AP and 34AP, respectively.

Figure 16:
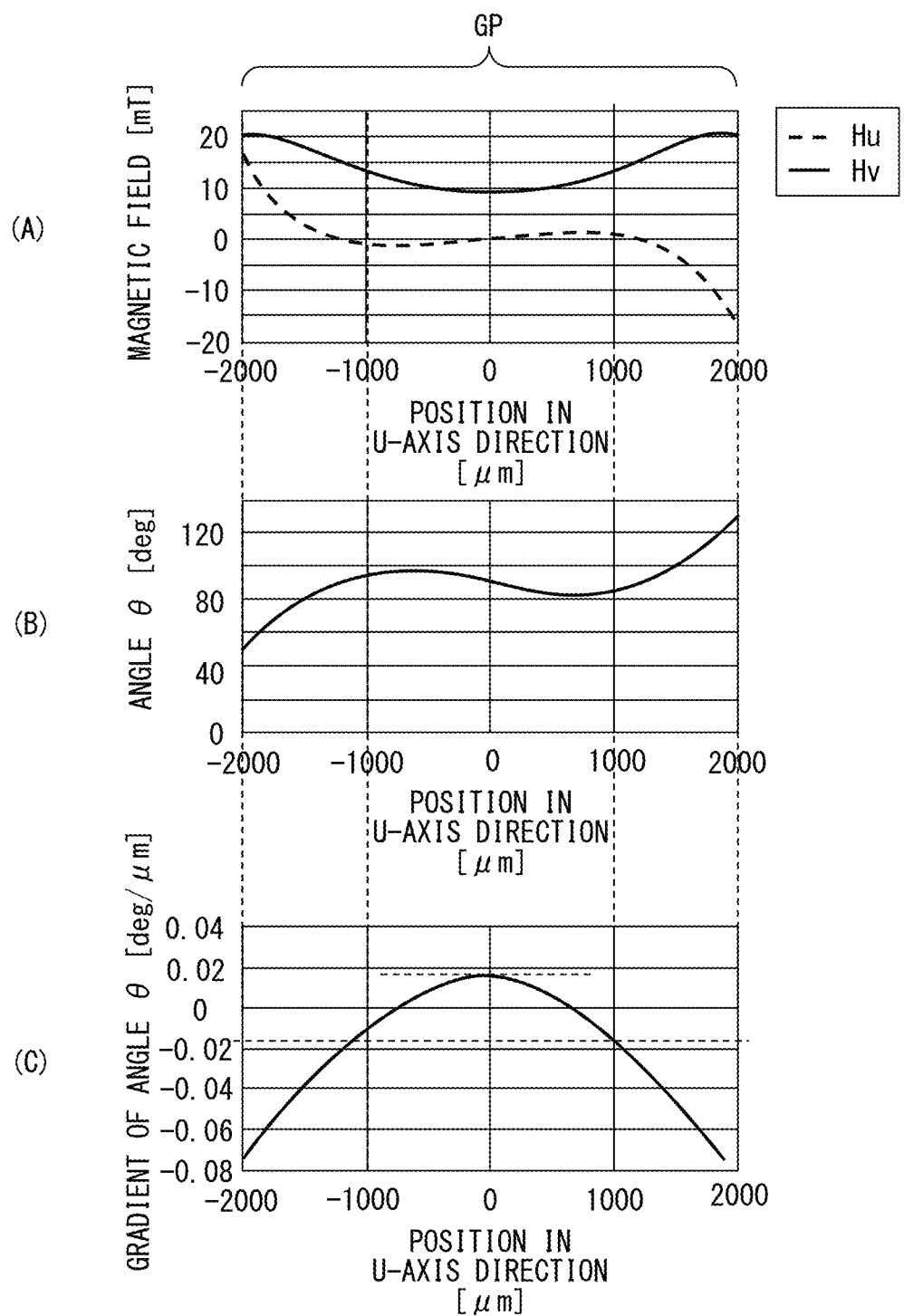
FIG. 16 is a characteristic diagram illustrating a relationship between a position in a U-axis direction and the intensity of the first magnetic field in the position detection unit illustrated in FIG. 14.

According to the lens module 300A of the present modification example, in the U-axis direction, the center position P20 of the magnetic sensor 20 lies at a position in the region GP between the magnets 31A and 34A other than the midpoint position P11. This makes it possible to reduce an error of the output signal of the magnetic sensor 20 that can occur in a case where, for example, the implementation relative position of the magnetic sensor 20 with respect to the magnets 31A and 34A becomes different from the design relative position thereof with respect to the magnets 31A and 34A. With reference to FIG. 16, a description will be given below of an influence of the relative position of the magnetic sensor 20 with respect to the magnets 31A and 34A on the first magnetic field MF1 to be applied to the magnetic sensor 20.

FIG. 16 is a characteristic diagram illustrating a position dependence of the intensity of the first magnetic field MF1 regarding a position detection unit 1A. Part (A) at the top of FIG. 16 is a characteristic diagram illustrating a relationship between a position [μm] in the U-axis direction in the region GP and the intensity of the first magnetic field MF1 in the region GP. In the part (A) of FIG. 16, the dashed-line plot represents a magnetic field Hu, and the solid-line plot represents a magnetic field Hv. The magnetic fields Hu and Hv are a U-axis direction component and a V-axis direction component, respectively, of the first magnetic field MF1 generated by the magnets 31A and 34A. Part (B) in the middle of FIG. 16 is a characteristic diagram illustrating how an angle θ [deg] between a direction of the magnetic field Hu, i.e., the U-axis direction component of the first magnetic field MF1, and a direction of the magnetic field Hv, i.e., the V-axis direction component of the first magnetic field MF1, changed in accordance with the position [μm] in the U-axis direction in the region GP. Part (C) at the bottom of FIG. 16 is a characteristic diagram illustrating how a gradient of the angle θ [deg/μm] illustrated in part (B) of FIG. 16 changed in accordance with the position [μm] in the U-axis direction in the region GP. As illustrated in (A) of FIG. 16, the magnetic field Hu (the U-axis direction component of the first magnetic field MF1) and the magnetic field Hv (the V-axis direction component of the first magnetic field MF1) each varied depending on the position in the U-axis direction. That is, as illustrated in (B) of FIG. 16, the orientation (the angle) of the first magnetic field MF1 being applied to the magnetic sensor 20 varied depending on the position of the magnetic sensor 20 in the U-axis direction. As illustrated in (C) of FIG. 16, the gradient of the variation was smaller in the vicinity of the midpoint position P11 than at the midpoint position P11 in the U-axis direction. Therefore, by setting the center position P20 of the magnetic sensor 20 to a position other than the midpoint position P11, it is possible to reduce an error of the output signal of the magnetic sensor 20 that can occur in the case where the implementation relative position of the magnetic sensor 20 becomes different from the design relative position thereof.

In some embodiments, the position detection unit 1A in the lens module 300A may satisfy the following expression (3), for example. This makes it possible to reduce a measurement error of the magnetic sensor 20 caused by misalignment of the magnetic sensor 20, as compared with the case where the center position P20 of the magnetic sensor 20 is intended to be located at the midpoint position P11. See part (C) of FIG. 16.

$$0 < D < (G/4) \quad (3)$$

where D represents a distance from the midpoint position P11 between the vertex 31AP of the magnet 31A and the vertex 34AP of the magnet 34A in the U-axis direction to the center position P20 of the magnetic sensor 20 in the U-axis direction, and G represents a distance between the vertex 31AP of the magnet 31A and the vertex 34AP of the magnet 34A in the U-axis direction.

Figure 17:
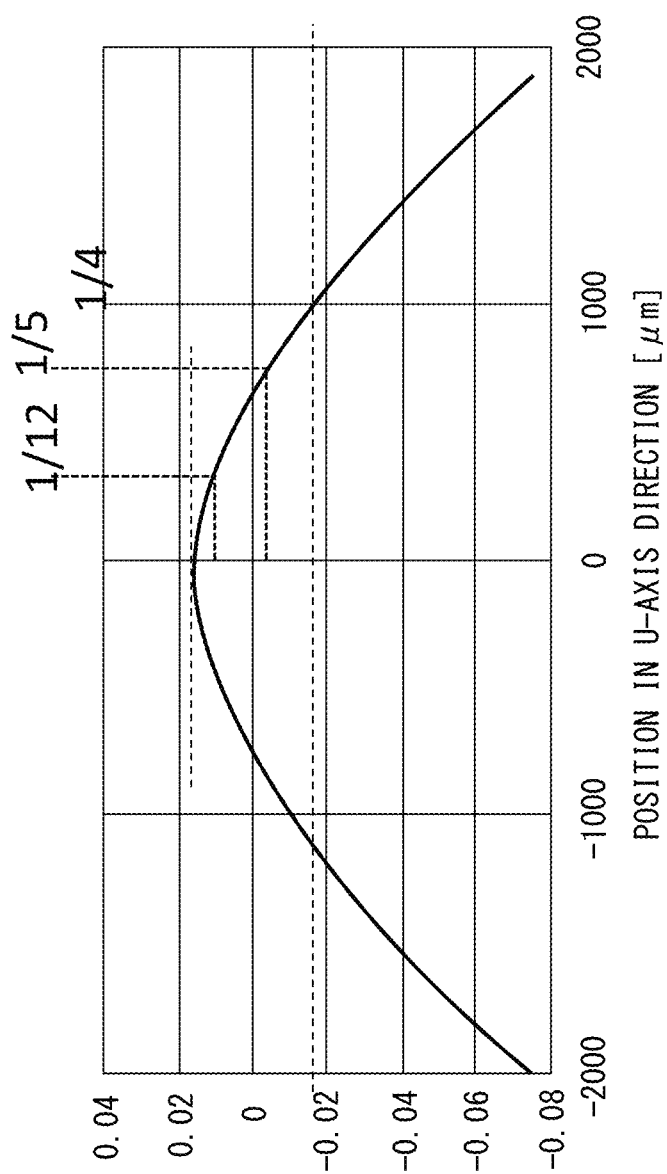
FIG. 17 enlarges a characteristic diagram in part (C) of FIG. 16.

Further, in some embodiments, the position detection unit 1A may satisfy the following expression (4), as illustrated in FIG. 17. This makes it possible to further reduce the measurement error of the magnetic sensor 20. FIG. 17 enlarges a portion of part (C) of FIG. 16.

$$(G/12) < D < (G/5) \quad (4).$$

Figure 18:
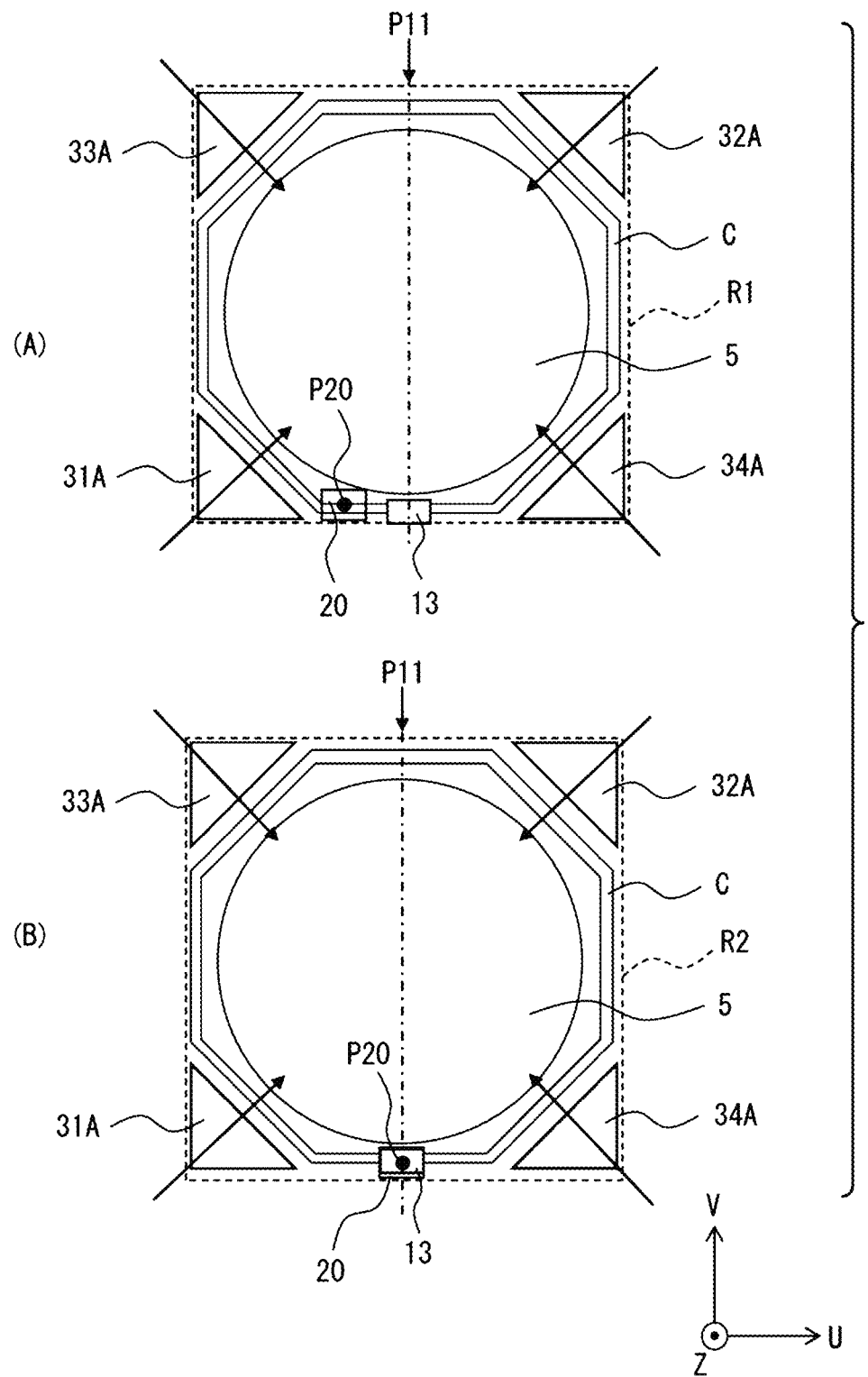
FIG. 18 is an explanatory diagram for describing an effect of the lens module according to the first modification example illustrated in FIG. 14.

In the lens module 300A, as illustrated in part (A) of FIG. 18, the center position P20 of the magnetic sensor 20 may be shifted from the midpoint position P11 between the magnets 31A and 34A. This allows for effective use of the space around the lens 5 that is circular in planar shape, as compared with a case where the center position P20 of the magnetic sensor 20 lies at the midpoint position P11 as illustrated in part (B) of FIG. 18. As a result, it is possible to reduce a footprint of the lens module 300A as a whole in a case of installing the lens 5 of a predetermined size. This helps to achieve miniaturization of the lens module 300A and also of the imaging apparatus 100 including the lens module 300A. FIG. 18 is an explanatory diagram for describing an effect of the lens module 300A of the present modification example. Regarding the lens module 300A, the shape and the arrangement positions of the magnets 31A, 32A, 33A, and 34A have been described above. The magnets 31B, 32B, 33B, and 34B may be provided with a shape and arrangement positions similar to those of the magnets 31A, 32A, 33A, and 34A illustrated in FIGS. 14 and 15.

Figure 14:
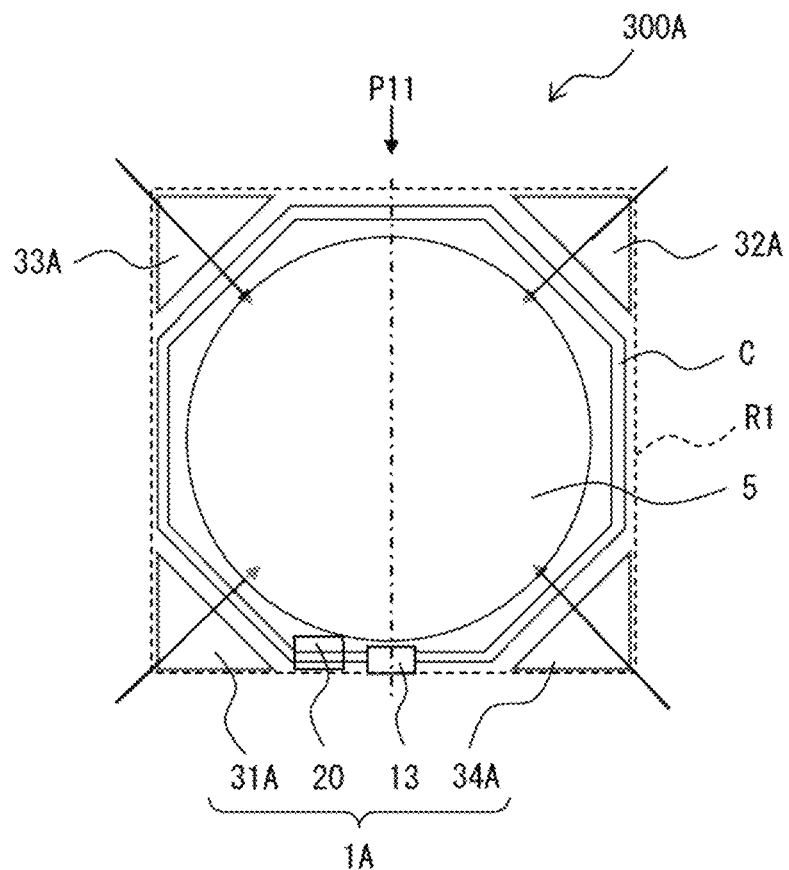
FIG. 14 is a planar diagram illustrating an arrangement example of magnets in a lens module according to a first modification example of the example embodiment of the technology.
Figure 14:
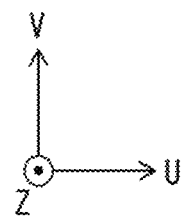
Figure 19A:
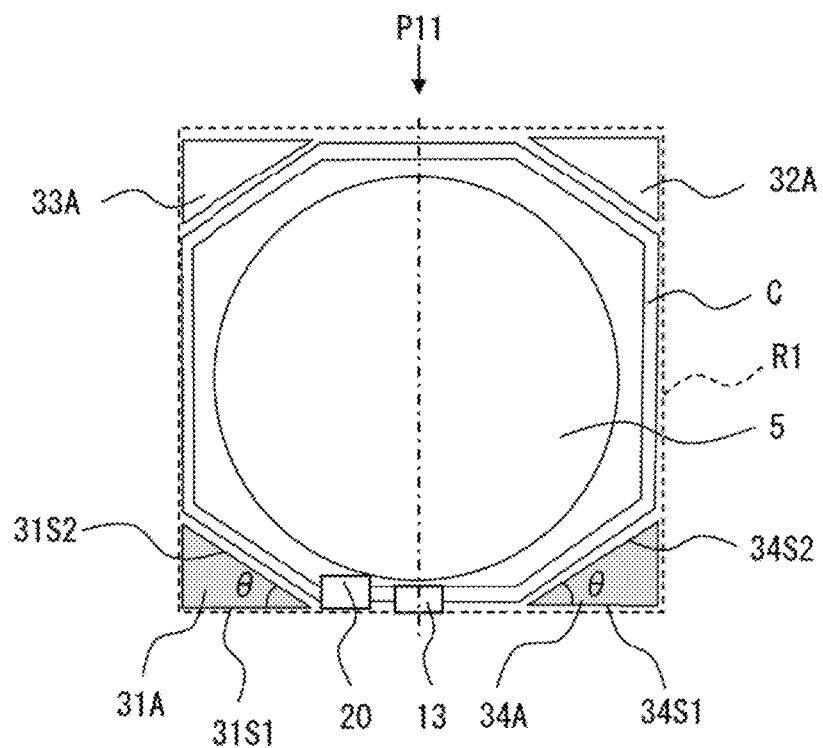
FIG. 19A is a planar diagram illustrating a shape of magnets in a lens module according to a second modification example of the example embodiment of the technology.
Figure 19A:
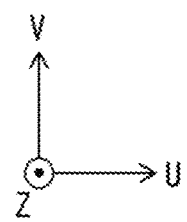
Figure 19B:
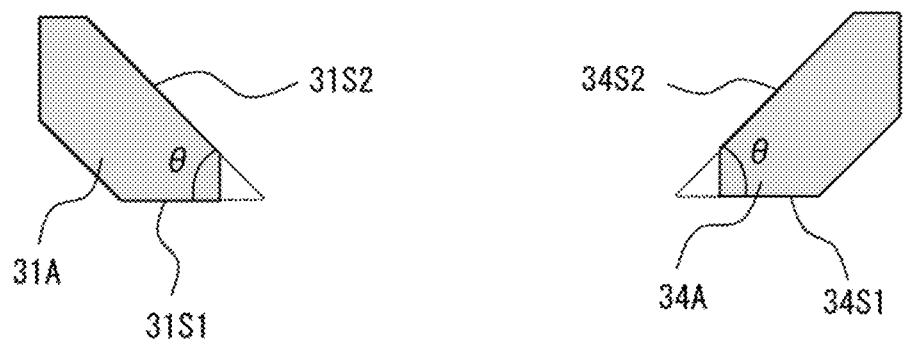
FIG. 19B is a planar diagram illustrating a shape of magnets according to a third modification example of the example embodiment of the technology.
Figure 19C:
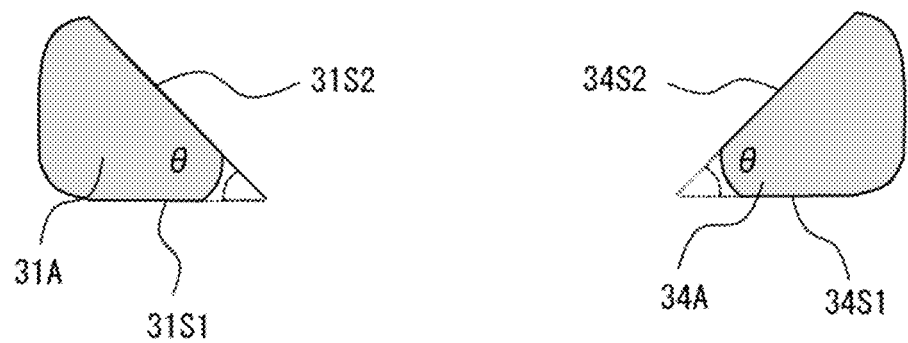
FIG. 19C is a planar diagram illustrating a shape of magnets according to a fourth modification example of the example embodiment of the technology.
Figure 19D:
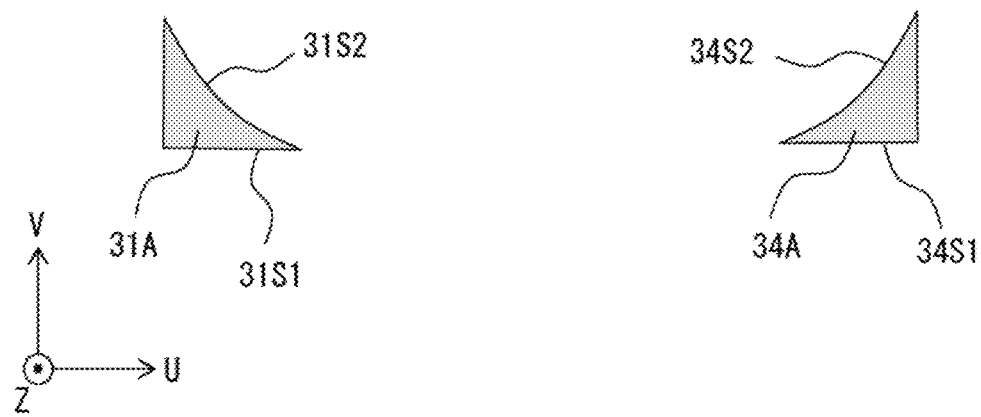
FIG. 19D is a planar diagram illustrating a shape of magnets according to a fifth modification example of the example embodiment of the technology.

The foregoing modification example describes an example of the four magnets each having a planar contour in the shape of a right isosceles triangle with a base angle of 45°, as illustrated in FIGS. 14 and 15. However, embodiments of the technology are not limited to such an example. In any embodiment of the technology, the first magnet and the second magnet are not limited in their shape as long as: the first and second magnets each have a first plane and a second plane, the first plane forming an angle of 90°±5° with respect to a plane and being along the first direction, the second plane forming an angle of 90°±5° with respect to the plane and forming an angle of less than or equal to 45°±5° with respect to the first plane; and the second plane of the first magnet and the second plane of the second magnet are opposed to each other in the first direction and increase in distance from each other in the first direction as a distance from the first plane to the second plane in the first magnet and a distance from the first plane to the second plane in the second magnet increase. Like an example illustrated in FIG. 19A, the magnets 31A and 34A may include respective end faces 31S1 and 34S1 along the U-axis direction and respective side surfaces 31S2 and 34S2 forming an angle θ of less than or equal to 45°±5° with respect to the end faces 31S1 and 34S1, respectively, and may each have a planar contour in a right triangle shape. Further, like an example illustrated in FIG. 19B, the magnets 31A and 34A may each have a planar contour in a polygonal shape (a hexagonal shape in FIG. 19B). Further, like an example illustrated in FIG. 19C, the magnets 31A and 34A may each have a planar contour including a straight line and a curve. Further, like an example illustrated in FIG. 19D, the magnets 31A and 34A may respectively have curved side surfaces 31S2 and 34S2.

The first plane according to some embodiments of the technology may not necessarily be an outer surface (e.g., a first surface) itself of an actual magnet but may be a first virtual geometric plane including the first surface of the actual magnet. The second plane according to some embodiments of the technology may not necessarily be an outer surface (e.g., a second surface) itself of an actual magnet but may be a second virtual geometric plane including the second surface of the actual magnet.

The foregoing example embodiment describes an example in which, as illustrated in FIG. 9, the entire magnetic sensor 20 lies in the region GP between the magnets 31A and 34A in the X-axis direction. However, embodiments of the technology are not limited to such an example. In any embodiment of the technology, a portion of the magnetic sensor may lie off the region between the first magnet and the second magnet in the first direction.

It is to be noted that, as used herein, the term "orthogonal" may encompass not only being geometrically exactly 90° but also being 90° plus or minus a manufacturing error or so, e.g., plus or minus about 5°.

The technology encompasses any possible combination of some or all of the various embodiments and the modifications described herein and incorporated herein.

It is possible to achieve at least the following configurations from the foregoing embodiments and modification examples of the technology.

(1)

A position detection unit including:
a magnetic sensor;
a first magnetic field generator that includes a first magnet and a second magnet and generates a first magnetic field, the first magnet and the second magnet being spaced apart from each other in a first direction; and
a second magnetic field generator that generates a second magnetic field and is movable along a second direction orthogonal to the first direction with respect to the first magnetic field generator and the magnetic sensor, in which
in the first direction, a center position of the magnetic sensor lies at a position in a region between the first magnet and the second magnet other than a midpoint position between the first magnet and the second magnet, and
the magnetic sensor is configured to generate a detection signal corresponding to a direction of a detection-target magnetic field, and configured to detect a positional change of the second magnetic field generator, the detection-target magnetic field being a magnetic field to be detected, and being a composite of the first magnetic field along a plane orthogonal to the second direction and the second magnetic field along the plane.

(2)

The position detection unit according to (1), in which, in the first direction, an entirety of the magnetic sensor is disposed at a position in the region between the first magnet and the second magnet other than the midpoint position between the first magnet and the second magnet.

(3)

The position detection unit according to (1) or (2), in which, in the first direction, the second magnetic field generator is disposed in the region between the first magnet and the second magnet, with a portion of the second magnetic field generator lying at the midpoint position between the first magnet and the second magnet.

(4)

The position detection unit according to (1) or (2), in which a center position of the second magnetic field generator in the first direction lies at the midpoint position between the first magnet and the second magnet in the first direction.

(5)

The position detection unit according to any one of (1) to (4), in which the first magnet and the second magnet each include a vertex defined by a first plane and a second plane, the first plane and the second plane meeting together to form the vertex, the first plane forming an angle of 90 degrees plus or minus 5 degrees with respect to the plane and an angle of 45 degrees plus or minus 5 degrees with respect to the first direction, the second plane forming an angle of 90 degrees plus or minus 5 degrees with respect to the plane and an angle of 90 degrees plus or minus 5 degrees with respect to the first plane, the second plane at the first magnet and the second plane at the second magnet form an angle of 90 degrees plus or minus 5 degrees with respect to each other, and the first magnet and the second magnet are arranged in orientations that allow a distance from the magnetic sensor to the first magnet and a distance from the magnetic sensor to the second magnet to be smallest at their respective vertexes, and an expression (1) is satisfied:

$$0<D<(G\times 2/5) \qquad (1)$$

where

D represents a distance from a midpoint position between the vertex of the first magnet and the vertex of the second magnet in the first direction to the center position of the magnetic sensor in the first direction, and G represents a distance between the vertex of the first magnet and the vertex of the second magnet in the first direction.

(6)

The position detection unit according to (5), in which an expression (2) is satisfied:

$$(G/6)<D<(G/3) \qquad (2).$$

(7)

The position detection unit according to any one of (1) to (4), in which the first magnet and the second magnet each include:
a first plane that forms an angle of 90 degrees plus or minus 5 degrees with respect to the plane and is along the first direction; and
a second plane including a portion that forms an angle of 90 degrees plus or minus 5 degrees with respect to the plane and forms an angle of less than or equal to 45 degrees plus or minus 5 degrees with respect to the first plane, the second plane of the first magnet and the second plane of the second magnet are opposed to each other in the first direction and increase in distance from each other in the first direction as a distance from the first plane to the second plane in the first magnet and a distance from the first plane to the second plane in the second magnet increase, and an expression (3) is satisfied:

$$0<D<(G/4) \qquad (3)$$

where

D represents a distance from the midpoint position between the first magnet and the second magnet in the first direction to the center position of the magnetic sensor in the first direction, and G represents a shortest distance between the first magnet and the second magnet in the first direction.

(8)

The position detection unit according to (7), in which an expression (4) is satisfied:

$$(G/12)<D<(G/5) \qquad (4)$$

where

D represents a distance from the midpoint position between the first magnet and the second magnet in the first direction to the center position of the magnetic sensor in the first direction, and G represents a distance between the first magnet and the second magnet in the first direction.

(9)

The position detection unit according to any one of (1) to (8), in which the first magnet and the second magnet each include a first magnetic material and have a first shape, and the second magnetic field generator includes a third magnet including a second magnetic material and having a second shape.

(10)

The position detection unit according to (9), in which the first magnet has a first temperature coefficient of residual magnetic flux density, and the second magnet has a second temperature coefficient of residual magnetic flux density, the second temperature coefficient of residual magnetic flux density being smaller in absolute value than the first temperature coefficient of residual magnetic flux density.

(11)

The position detection unit according to (9) or (10), in which the first magnetic material includes NdFeB, and the second magnetic material includes SmCo.

(12)

The position detection unit according to any one of (1) to (11), further including:

a first holding member holding the first magnetic field generator; and a second holding member holding the second magnetic field generator and movable along the second direction with respect to the first holding member.

(13)

The position detection unit according to (12), in which the second holding member is configured to hold a lens having an optical axis along the second direction.

(14)

The position detection unit according to any one of (1) to (13), in which the magnetic sensor has a sensitive axis parallel to the plane orthogonal to the second direction.

(15)

A lens module including:

a magnetic sensor;

a first magnetic field generator that includes a first magnet and a second magnet and generates a first magnetic field, the first magnet and the second magnet being spaced apart from each other in a first direction;

a second magnetic field generator that generates a second magnetic field and is movable along a second direction orthogonal to the first direction with respect to the first magnetic field generator and the magnetic sensor; and a lens movable along the second direction in conjunction with the second magnetic field generator with respect to the first magnetic field generator and the magnetic sensor, in which in the first direction, a center position of the magnetic sensor lies at a position in a region between the first magnet and the second magnet other than a midpoint position between the first magnet and the second magnet, and the magnetic sensor is configured to generate a detection signal corresponding to a direction of a detection-target magnetic field, and configured to detect a positional change of the second magnetic field generator, the detection-target magnetic field being a magnetic field to be detected, and being a composite of the first magnetic field along a plane orthogonal to the second direction and the second magnetic field along the plane.

(16)

The lens module according to (15), further including:

a first holding member holding the first magnetic field generator; and a second holding member holding the second magnetic field generator and the lens, and movable along the second direction with respect to the first holding member.

(17)

An imaging apparatus including:

an imaging element, and a lens module, the lens module including:

a first magnetic field generator that includes a first magnet and a second magnet and generates a first magnetic field, the first magnet and the second magnet being spaced apart from each other in a first direction;

a second magnetic field generator that generates a second magnetic field and is movable along a second direction orthogonal to the first direction with respect to the first magnetic field generator and the magnetic sensor; and a lens movable along the second direction in conjunction with the second magnetic field generator with respect to the first magnetic field generator and the magnetic sensor, in which in the first direction, a center position of the magnetic sensor lies at a position in a region between the first magnet and the second magnet other than a midpoint position between the first magnet and the second magnet, and the magnetic sensor is configured to generate a detection signal corresponding to a direction of a detection-target magnetic field, and configured to detect a positional change of the second magnetic field generator, the detection-target magnetic field being a magnetic field to be detected, and being a composite of the first magnetic field along a plane orthogonal to the second direction and the second magnetic field along the plane.

The position detection unit, the lens module, and the imaging apparatus according to at least one embodiment of the technology achieve high detection accuracy.

Although the technology has been described hereinabove in terms of the example embodiment and modification examples, it is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A position detection unit comprising:
   a magnetic sensor;
   a first magnetic field generator that includes a first magnet and a second magnet and generates a first magnetic field, the first magnet and the second magnet being spaced apart from each other in a first direction; and
   a second magnetic field generator that generates a second magnetic field and is movable along a second direction orthogonal to the first direction with respect to the first magnetic field generator and the magnetic sensor, wherein
   in the first direction, a center position of the magnetic sensor lies at a position in a region between the first magnet and the second magnet other than a midpoint position between the first magnet and the second magnet,
   the magnetic sensor is configured to generate a detection signal corresponding to a direction of a detection-target magnetic field, and configured to detect a positional change of the second magnetic field generator, the detection-target magnetic field being a magnetic field to be detected, and being a composite of the first magnetic field along a plane orthogonal to the second direction and the second magnetic field along the plane,
   the first magnet and the second magnet each include a vertex defined by a first plane and a second plane, the first plane and the second plane meeting together to form the vertex, the first plane forming an angle of 90 degrees plus or minus 5 degrees with respect to the plane and an angle of 45 degrees plus or minus 5 degrees with respect to the first direction, the second plane forming an angle of 90 degrees plus or minus 5 degrees with respect to the plane and an angle of 90 degrees plus or minus 5 degrees with respect to the first plane,
   the second plane at the first magnet and the second plane at the second magnet form an angle of 90 degrees plus or minus 5 degrees with respect to each other,
   the first magnet and the second magnet are arranged in orientations that allow a distance from the magnetic sensor to the first magnet and a distance from the magnetic sensor to the second magnet to be smallest at their respective vertexes, and
   an expression (1) is satisfied:

$$0<D<(G\times2/5) \qquad (1)$$

where
   D represents a distance from the midpoint position between the vertex of the first magnet and the vertex of the second magnet in the first direction to the center position of the magnetic sensor in the first direction, and
   G represents a distance between the vertex of the first magnet and the vertex of the second magnet in the first direction.

2. The position detection unit according to claim 1, wherein, in the first direction, an entirety of the magnetic sensor is disposed at a position in the region between the first magnet and the second magnet other than the midpoint position between the first magnet and the second magnet.

3. The position detection unit according to claim 1, wherein, in the first direction, the second magnetic field generator is disposed in the region between the first magnet and the second magnet, with a portion of the second magnetic field generator lying at the midpoint position between the first magnet and the second magnet.

4. The position detection unit according to claim 1, wherein a center position of the second magnetic field generator in the first direction lies at the midpoint position between the first magnet and the second magnet in the first direction.

5. The position detection unit according to claim 1, wherein an expression (2) is satisfied:

$$(G/6)<D<(G/3) \qquad (2).$$

6. The position detection unit according to claim 1, wherein
   the first magnet and the second magnet each include a first magnetic material and have a first shape, and
   the second magnetic field generator includes a third magnet including a second magnetic material and having a second shape.

7. The position detection unit according to claim 6, wherein the first magnet has a first temperature coefficient of residual magnetic flux density, and the second magnet has a second temperature coefficient of residual magnetic flux density, the second temperature coefficient of residual magnetic flux density being smaller in absolute value than the first temperature coefficient of residual magnetic flux density.

8. The position detection unit according to claim 6, wherein
   the first magnetic material includes NdFeB, and
   the second magnetic material includes SmCo.

9. The position detection unit according to claim 1, further comprising:
   a first holding member holding the first magnetic field generator; and
   a second holding member holding the second magnetic field generator and movable along the second direction with respect to the first holding member.

10. The position detection unit according to claim 9, wherein the second holding member is configured to hold a lens having an optical axis along the second direction.

11. The position detection unit according to claim 1, wherein the magnetic sensor has a sensitive axis parallel to the plane orthogonal to the second direction.

12. A lens module comprising:
    the position detection unit according to claim 1; and
    a lens movable along the second direction in conjunction with the second magnetic field generator with respect to the first magnetic field generator and the magnetic sensor.

13. The lens module according to claim 12, further comprising:
    a first holding member holding the first magnetic field generator; and
    a second holding member holding the second magnetic field generator and the lens, and movable along the second direction with respect to the first holding member.

14. An imaging apparatus including
    the lens module according to claim 12, and
    an imaging element.

15. A position detection unit comprising: 7.
    a magnetic sensor;
    a first magnetic field generator that includes a first magnet and a second magnet and generates a first magnetic field, the first magnet and the second magnet being spaced apart from each other in a first direction; and
    a second magnetic field generator that generates a second magnetic field and is movable along a second direction orthogonal to the first direction with respect to the first magnetic field generator and the magnetic sensor, wherein in the first direction, a center position of the magnetic sensor lies at a position in a region between the first magnet and the second magnet other than a midpoint position between the first magnet and the second magnet, the magnetic sensor is configured to generate a detection signal corresponding to a direction of a detection-target magnetic field, and configured to detect a positional change of the second magnetic field generator, the detection-target magnetic field being a magnetic field to be detected, and being a composite of the first magnetic field along a plane orthogonal to the second direction and the second magnetic field along the plane, the first magnet and the second magnet each include:
- a first plane that forms an angle of 90 degrees plus or minus 5 degrees with respect to the plane and is along the first direction; and
- a second plane including a portion that forms an angle of 90 degrees plus or minus 5 degrees with respect to the plane and forms an angle of less than or equal to 45 degrees plus or minus 5 degrees with respect to the first plane, the second plane of the first magnet and the second plane of the second magnet are opposed to each other in the first direction and increase in distance from each other in the first direction as a distance from the first plane to the second plane in the first magnet and a distance from the first plane to the second plane in the second magnet increase, and an expression (3) is satisfied:

$$0 < D < (G/4) \qquad (3)$$

where

D represents a distance from the midpoint position between the first magnet and the second magnet in the first direction to the center position of the magnetic sensor in the first direction, and G represents a shortest distance between the first magnet and the second magnet in the first direction.

16. The position detection unit according to claim 15, wherein an expression (4) is satisfied:

$$(G/12) < D < (G/5) \qquad (4).$$

* * * * *